United States Patent
Nelson et al.

(10) Patent No.: US 10,726,668 B2
(45) Date of Patent: Jul. 28, 2020

(54) TRANSFER VERIFICATION OF MOBILE PAYMENTS

(71) Applicant: IGT, Las Vegas, NV (US)

(72) Inventors: Dwayne R. Nelson, Las Vegas, NV (US); Steve G. Lemay, Reno, NV (US)

(73) Assignee: IGT, Las Vegas, NV (US)

( * ) Notice: Subject to any disclaimer, the term of this patent is extended or adjusted under 35 U.S.C. 154(b) by 915 days.

(21) Appl. No.: 13/782,502

(22) Filed: Mar. 1, 2013

(65) Prior Publication Data

US 2014/0248941 A1     Sep. 4, 2014

(51) Int. Cl.
G07F 17/32     (2006.01)
G06Q 20/32     (2012.01)
G06Q 20/10     (2012.01)

(52) U.S. Cl.
CPC ......... *G07F 17/3241* (2013.01); *G06Q 20/10* (2013.01); *G06Q 20/3221* (2013.01); *G07F 17/3206* (2013.01); *G07F 17/3218* (2013.01)

(58) Field of Classification Search
USPC ............... 463/25, 16, 29; 705/35, 39, 317
See application file for complete search history.

(56) References Cited

U.S. PATENT DOCUMENTS

| | | | |
|---|---|---|---|
| 5,902,983 A * | 5/1999 | Crevelt et al. | 235/380 |
| 6,544,126 B2 † | 4/2003 | Sawano | |
| 6,585,598 B2 * | 7/2003 | Nguyen et al. | 463/41 |
| 6,846,238 B2 * | 1/2005 | Wells | G07F 17/32 463/25 |
| 6,945,870 B2 * | 9/2005 | Gatto | G07F 17/32 340/5.52 |
| 7,107,245 B1 * | 9/2006 | Kowalick | 705/44 |
| 7,611,409 B2 * | 11/2009 | Muir | G07F 17/3232 273/138.1 |
| 7,613,654 B2 * | 11/2009 | Jenny et al. | 705/39 |
| 7,693,306 B2 | 4/2010 | Huber | |
| 7,699,703 B2 * | 4/2010 | Muir | G07F 17/32 273/138.1 |
| 7,771,277 B2 * | 8/2010 | Chamberlain et al. | 463/29 |
| 7,988,550 B2 | 8/2011 | White | |
| 8,118,668 B2 | 2/2012 | Gagner et al. | |
| 8,282,465 B2 | 10/2012 | Giobbi | |
| 8,369,828 B2 * | 2/2013 | Hamzeh | 455/406 |
| 8,393,955 B2 | 3/2013 | Arezina et al. | |
| 8,419,548 B2 | 4/2013 | Gagner et al. | |

(Continued)

FOREIGN PATENT DOCUMENTS

JP     2002-230492 A    †  8/2002

OTHER PUBLICATIONS

Gregory Gambone, "What is a Sales Receipt?" http://smallbusiness.chron.com/sales-receipt-16680.html. Dec. 29, 2011.*

(Continued)

*Primary Examiner* — Lynda Jasmin
*Assistant Examiner* — Johnathan J Lindsey, III
(74) *Attorney, Agent, or Firm* — Sheridan Ross P.C.

(57) ABSTRACT

A gaming system sends a transfer verification message containing mobile payment transfer information for providing the transfer verification for completion of a mobile payment transfer, wherein an audit trail is maintained.

39 Claims, 15 Drawing Sheets

(56) References Cited

U.S. PATENT DOCUMENTS

| | | | | |
|---|---|---|---|---|
| 8,423,457 B1* | 4/2013 | Schattauer | G06Q 20/10 | 705/14.26 |
| 8,616,981 B1 | 12/2013 | Guinn et al. | | |
| 8,626,659 B1* | 1/2014 | Bowman | G06Q 20/24 | 235/380 |
| 8,706,588 B1* | 4/2014 | Zhu | G06Q 20/32 | 705/35 |
| 8,734,236 B2 | 5/2014 | Arezina et al. | | |
| 8,751,379 B1* | 6/2014 | Bueche, Jr. | | 705/39 |
| 8,845,422 B2 | 9/2014 | Weber | | |
| 8,888,586 B2 | 11/2014 | Hsu | | |
| 8,924,287 B1* | 12/2014 | Gailloux | G06Q 20/32 | 705/39 |
| 8,926,422 B2* | 1/2015 | Anderson | G07F 17/3209 | 463/16 |
| 8,932,140 B2 | 1/2015 | Gagner et al. | | |
| 9,672,686 B2* | 6/2017 | Nguyen | G07F 17/3218 | |
| 2004/0185935 A1* | 9/2004 | Yamagishi | A63F 13/12 | 463/42 |
| 2005/0101383 A1* | 5/2005 | Wells | G07F 17/32 | 463/39 |
| 2005/0227770 A1* | 10/2005 | Papulov | G07F 17/32 | 463/42 |
| 2006/0259445 A1* | 11/2006 | Chatte | G06Q 20/32 | 705/408 |
| 2008/0288382 A1* | 11/2008 | Smith | G06Q 40/00 | 705/35 |
| 2009/0176566 A1* | 7/2009 | Kelly | G07F 17/32 | 463/29 |
| 2010/0260388 A1* | 10/2010 | Garrett | G06Q 20/22 | 382/124 |
| 2010/0331079 A1 | 12/2010 | Bytnar et al. | | |
| 2012/0047072 A1* | 2/2012 | Larkin | | 705/44 |
| 2012/0058826 A1* | 3/2012 | Amaitis | G07F 17/3218 | 463/42 |
| 2012/0295580 A1* | 11/2012 | Corner | H04W 12/12 | 455/405 |
| 2012/0323762 A1* | 12/2012 | Kapur | G06Q 20/10 | 705/39 |
| 2013/0017884 A1* | 1/2013 | Price | G07F 17/32 | 463/25 |
| 2013/0023339 A1* | 1/2013 | Davis | G07F 17/3206 | 463/29 |
| 2013/0060708 A1* | 3/2013 | Oskolkov | G06Q 20/10 | 705/75 |
| 2013/0065666 A1* | 3/2013 | Schueller | G07F 17/3244 | 463/25 |
| 2013/0065668 A1* | 3/2013 | LeMay | G07F 17/3223 | 463/25 |
| 2013/0084963 A1* | 4/2013 | Shorrock | G07F 17/3225 | 463/25 |
| 2013/0090155 A1* | 4/2013 | Johnson | | 463/25 |
| 2013/0130777 A1* | 5/2013 | LeMay | G07F 17/3218 | 463/25 |
| 2013/0218769 A1* | 8/2013 | Pourfallah | G06Q 20/10 | 705/44 |
| 2013/0316808 A1* | 11/2013 | Nelson | G07F 17/3204 | 463/29 |
| 2013/0324237 A1 | 12/2013 | Adiraju et al. | | |
| 2014/0045586 A1 | 2/2014 | Allen et al. | | |
| 2014/0080578 A1* | 3/2014 | Nguyen | G07F 17/3204 | 463/25 |
| 2014/0342820 A1 | 11/2014 | Nelson et al. | | |
| 2015/0072774 A1 | 3/2015 | Anderson et al. | | |

OTHER PUBLICATIONS

Howard ("Make Payments by Cell Phone," Mar. 2, 2010. http://www.bankrate.com/system/util/print.aspx?p=/finance/savings/make-payments-by-cell-phone-1.aspx&s=br3&c=checking&t=story&e=1&v=1).*

Komando ("Use Your Phone as Your TV Remote," USA Today. Nov. 18, 2010. http://usatoday30.usatoday.com/tech/columnist/kimkomando/2010-11-18-mobile-remotes_N.htm).*

Google ("2-Step Verification," https://www.google.com/landing/2step/index.html. Mar. 2, 2013.).*

Google, "2-Step Verification" (Mar. 3, 2013), https://www.google.com/landing/2step/ index.html. (Year: 2013).*

Gambone, "What is a Sales Receipt?" (Dec. 29, 2011), http://smallbusiness.chron.com/sales-receipt-16680.html. (Year: 2011).*

Gambone ("What is a Sales Receipt?" http://smallbusiness.chron.com/sales-receipt-16680.html. Dec. 29, 2011) (Year: 2011).*

Google, "2-Step Verification," https://www.google.com/landing/2step/ index.html. Mar. 3, 2013. (Year: 2013).*

EIC 3600 Search Report (dated 2018).*

\* cited by examiner
† cited by third party

TRANSFER VERIFICATION OF MOBILE PAYMENTS

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Field of the Invention

The present invention relates in general to gaming devices and systems, and more particularly to transfer verification of mobile payments in a gaming system.

Description of the Related Art

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of electronic games. Many electronic gaming machines (EGMs), such as slot machines and video poker machines, have been a cornerstone of the gaming industry for several years. The EGMs are computer based and contain multiple external interfaces for connecting with external devices and mobile devices.

SUMMARY OF THE DESCRIBED EMBODIMENTS

A current challenge for gaming institutions, in view of increasingly popular use by players, and an increasing number of electronic gaming machines (EGM) and the like in gaming environments, is advantageously providing the EGMs, especially microprocessor-based gaming machines that store gaming programs for operating and using the EGM, with the flexibility and capabilities of communicating with external devices. As the gaming industry becomes more mobile it is likely that players will be using their various external devices (e.g., mobile devices such as cell phones and the like) in Casinos and other gaming venues. There are benefits to allowing players to use their mobile devices (phones, tablets, etc.) to transfer money to and from gaming machines and gaming kiosks. One of the challenges with electronic transfers is gaining customer acceptance. Thus, a need exists to provide transfer verification of mobile payments in a gaming system to gain player confidence in mobile money transfers.

To address these aforementioned needs, in one embodiment, by way of example only, a method is provided for transfer verification of mobile payments in a gaming system. The gaming system sends a transfer verification message containing mobile payment transfer information for providing the transfer verification for completion of a mobile payment transfer, wherein an audit trail is maintained. In addition to the foregoing exemplary method embodiment, other exemplary system and computer product embodiments are provided and supply related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
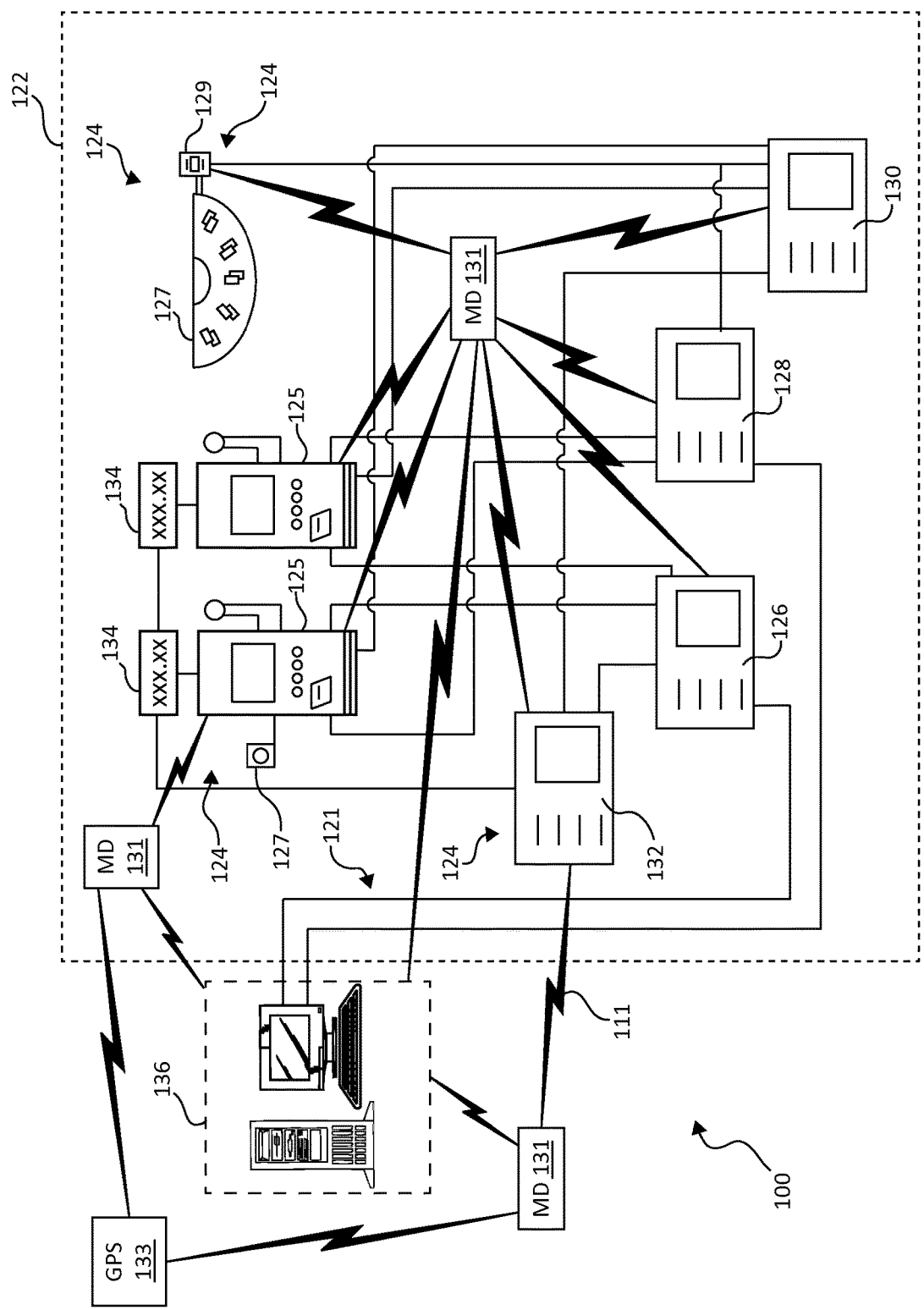
FIG. 1 is a block diagram illustrating a gaming system environment with a gaming terminal data repository (GTDR) connected via one or more network interface(s) to a gaming network which, for example, may include gaming devices (e.g., gaming terminals), in which aspects of the present invention may be realized.

In general, gaming machines require a player to place or make a wager to activate a primary or base game. The award may be based on the player obtaining a winning symbol or symbol combination and on the amount of the wager (e.g., the higher the wager, the higher the award). Symbols or symbol combinations that are less likely to occur usually provide higher awards. In such gaming machines, the amount of the wager made on the base game by the player may vary. For instance, a gaming machine may allow the player to wager a minimum number of credits, such as one credit (e.g., one penny, nickel, dime, quarter or dollar) up to a maximum number of credits, such as five credits. The player may make this wager a single time or multiple times in a single play of a primary game. For instance, a slot game may have one or more pay lines and the slot game may allow the player to make a wager on each pay line in a single play of the primary game. Slot games with 1, 3, 5, 9, 15 and 25 lines may be provided. Thus, a gaming device, such as a slot game, may allow players to make wagers of substantially different amounts on each play of the primary or base game ranging, for example, from one credit up to 125 credits (e.g., five credits on each of 25 separate pay lines). This is also true for other wagering games, such as video draw poker, where players can wager one or more credits on each hand and where multiple hands can be played simultaneously. Different players play at substantially different wagering amounts or levels and at substantially different rates of play.

Secondary or bonus games may also be provided in the gaming machines. The secondary or bonus games may provide an additional award to the player. Secondary or bonus games may not require an additional wager by the player to be activated. Secondary or bonus games may be activated or triggered upon an occurrence of a designated triggering symbol or triggering symbol combination in the primary or base game. For instance, a bonus symbol occurring on the pay line on the third reel of a three-reel slot machine may trigger the secondary bonus game. When a secondary or bonus game is triggered, the gaming machines may indicate this to the player through one or more visual and/or audio output devices, such as the reels, lights, display units, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Progressive awards may also be provided in gaming machines. A progressive award may be an award amount that includes an initial amount funded by a casino and an additional amount funded through a portion of each wager made on the progressive gaming machine. For example, 1% to 5% of each wager placed on the primary game of the gaming machine associated with the progressive award may be allocated to the progressive award or progressive award fund. The progressive award grows in value as more players play the gaming machine, and thus, portions of these players' wagers are allocated to the progressive award. When a player obtains a winning symbol or symbol combination, which results in the progressive award, the accumulated progressive award is provided to the player. After the progressive award is provided to the player, the amount of the next progressive award may be reset to an initial value, a predetermined value, or randomly generated value, and a portion of each subsequent wager on a gaming machine associated with the progressive is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressive ("LAP") and wide area progressive ("WAP"), respectively. Progressive awards may increment through communication between a progressive controller and one or more gaming machines. The gaming machines associated with the progressive award transfer coin-in information to a progressive controller. From this information, the progressive controller calculates how much to increment the progressive award based on a set increment rate and then increments the progressive award accordingly. The gaming machines may provide the player a choice between different wager levels prior to the commencement of a primary game. The different wager levels enable the player to win different progressive awards. The gaming devices provide a progressive jackpot where the value of the jackpot may increase by a particular amount for every game played. Thus, when multiple gaming devices are linked together to form one large progressive jackpot, the jackpot grows more quickly because multiple players are contributing to the jackpot at the same time.

As mentioned above, users of these gaming devices have a general interest in using their various external devices (e.g., mobile devices such as cell phones, electronic tablets, computers, and the like) in Casinos and other gaming venues. There are benefits to allowing players to use their mobile devices (phones, tablets, etc.) to transfer money to and from gaming machines and gaming kiosks. One of the challenges with electronic transfers is gaining customer acceptance. Thus, a need exists to provide transfer verification of mobile payments in a gaming system to gain player confidence in mobile money transfers.

To address these aforementioned needs, in one embodiment, by way of example only, a method is provided for transfer verification of mobile payments in a gaming system. The gaming system, upon completion of a mobile payment transfer, sends a transfer verification message containing mobile payment transfer information for providing the transfer verification, wherein an audit trail is maintained. In addition to the foregoing exemplary method embodiment, other exemplary system and computer product embodiments are provided and supply related advantages.

In one embodiment, Personal Electronic Devices (PED) may be used to transfer money, and the PED may use a variety of communication protocols such as near field communication (NFC), Bluetooth, and/or other wireless communications to transfer money to and from the EGM. The money of a player may come from any type of financial institution (e.g., a bank) and/or a player wagering account of one or more gaming venues. In one embodiment, the wireless communication may go directly to the processing unit on a particular and identified EGM. The EGM may be configured with a software and/or hardware device that communicates with the PED. The EGM may contain a device that communicates with a bill acceptor or printer to simulate bills and tickets. The EGM may have a device (software and/or hardware) that communicates with a back end host that ultimately uses SAS or G2S to move the money to and from the particular and identified EGM. This configuration allows all of EGMs to be retrofitted for mobile payments.

In one embodiment, when an actual wireless transfer occurs via a mobile device, money is electronically moved virtually from the EGM to the financial institution and/or PED or vice versa. The transfer process asks the player to trust the new technology in order to gain a players confidence due to this lack of trust. In this way, the player's trust is gained and an audit trail is provided. An email or text can be sent with the details of the transfer. In one embodiment, the player may cash out to their PED, players account, and/or financial institution and then immediately receive and view an email on the PED indicating that the transfer occurred. The transfer verification email may provide all of the details (date, time, transfer amount, property, EGM information, biometric information, digital signature, key codes, and/or any other type of information etc.) regarding the monetary transfer. This email may be used to resolve any disputes with the mobile payment transfer. The email may be used for accounting or income tax reporting purposes. The email may be sent for transfers to and from the EGM. Emails may also be sent to notify the player of their current account balance. The email may be used to dispute fraudulent use of the PED. For example if a person lost their PED and/or somebody stole the player's account information, they would receive at least one email indicating that the player's account was being used to transfer money in a gaming environment. The approval and/or instructions for responding to the request for approval in the email may be any one of the processes described herein or other process as deemed appropriate by a gaming venue. In this way, the player is notified in real time and may then execute a variety of security protocols for terminating the fraudulent activities, such as contacting the casino to cancel their account or handle the fraud.

In one embodiment, the transfer verification message is used for performing, authenticating, and preventing fraud of the mobile transfer of the money to and from an electronic gaming machine (EGM). In one embodiment, each EGM may have specific and unique identifiers and this identifying information of the EGM may be included in the transfer verification message. Moreover, the transfer verification message may include and be associated with a players account information, the EGM, geolocation information of the EGM (e.g., the physical location of the EGM in a gaming venue), serial numbers of the EGM, biometric data (e.g., a fingerprint taken from the PED, the EGM, and/or other location, and uploaded, verified, and included with the transfer verification message), geolocation information of the mobile device, banking account information, information regarding a bank level/bank of EGM's, and/or other verifiable data relating to the EGM and money transfer to be included in the transfer verification message associated with the money transfer. In one embodiment, each EGM may have specific and unique identifiers and this identifying information of the EGM may be included in the transfer verification message.

In one embodiment, the transfer verification message may be sent to alternative listed PEDs registered with a players account and/or provided to the gaming venue by a player. In this way, if a fraudulent money transfer occurs from a stolen players account and/or a player's personal PED, the player may be informed of such fraudulent activity by receiving the transfer verification message in a secondary listed and/or identified PED. At this point, the player may reject the fraudulent money transfer by rejecting a request to approve the transfer verification message when a requests for approval of the mobile payment transfer is sent in conjunction with the transfer verification message. The request for approval of the mobile payment transfer sent in conjunction with the transfer verification message may be included in the email and/or be sent in a secondary email that is sent at the same time. Thus, in one embodiment, both the first and at least one alternative PEDs receive both the request for approval of the mobile payment transfer and the transfer verification message. The request for approval and/or the transfer verification message may be sent as an email and/or as a short message service (SMS) text message. In one embodiment, if one or more alternative PEDs are used, the present invention may require both the primary and the secondary PED (or as many alternative PEDs that are used and listed with the gaming venue) to respond to the request for approval of the mobile payment transfer in transfer verification message when the requests for approval of the mobile payment transfer is sent in conjunction with the transfer verification message to both the first and the secondary PED. In this way, enhanced security is provided in the event either the first or secondary PED is lost or stolen.

In one embodiment, prior to completing the mobile transfer payment, the transfer verification message requires the player to respond back to the request for approval of the mobile payment transfer. Upon responding back to the request for approval of the mobile payment transfer, the mobile payment is electronically transferred from the EGM to the financial institution, PED, and/or player account, and/or electronically transferred from the financial institution and/or player account to the EGM via the mobile device. In one embodiment, the request for approval requires the data included in the transfer verification message to be verified and/or validated by the player. The transfer verification message may include a confirmation number for the mobile payment transfer. For example, either the player responds back to the transfer verification message and/or selects a link contained within the transfer verification message for login to a host/EGM for entering a password, digital signature, and/or verifying type of data for verifying and approving the mobile payment transfer. In one embodiment, the transfer verification message may be limited to the gaming venue (e.g., limiting the PED to an intranet communications and/or house network of the gaming venue) for performing the mobile transfer. Thus, in one embodiment the player is required to be physically located on the premises of the gaming venue in order to complete the mobile transfer. In one embodiment the player is required to be located within access range of a gaming network of a gaming venue in order to complete the mobile transfer.

Turning now to FIG. 1, a block diagram illustrating a gaming system environment 100 is shown. Environment 100 includes a Gaming Terminal Data Repository (GTDR) connected via one or more network interface(s) to a gaming network which, for example, may include gaming devices (e.g., gaming terminals) and/or other devices, in which aspects of the present invention may be realized. As illustrated in FIG. 1, the gaming environment 100 may comprise a gaming system/environment 122 located in a physical environment (not shown). It will be appreciated that the communications links between the various components may be separate and distinct or may be commonly used. It will also be appreciated that one or more of the functions or applications described above may be consolidated, such as at a common server or host. Further, other components for implementing other functionality may be provided. For example, a variety of computing devices, such as user stations, may be connected to the various systems. Printers and other peripheral devices may also be connected to each network or system. A gaming system/environment 122 may be located at least partially in one or more physical gaming environments, such as a casino, restaurant, and/or convenience store. For example, the casino may include publicly accessible game areas where certain of the gaming system devices 124, such as gaming machines 125 and table games 127 are located, as well as secure areas where the servers and other components are located.

In one embodiment, the physical environment includes at least a portion of a physical structure, such as casino, housing one or more components of the gaming system/environment 122. The gaming system/environment 122 includes one or more gaming system devices 124 or components. The gaming system devices 124 may include gaming machines 125, such as those known as video or slot machines. The devices 124 may also include "table" games 127 such as Blackjack and Roulette. The gaming devices 124 may also include components or devices such as player tracking card readers 129, coin counters and other gaming devices functionality options, which devices or components may be linked or associated with other devices. The devices or components may also comprise computers or servers and communication equipment, cashier and accounting workstations and a wide variety of other elements.

In one embodiment, the gaming system/environment 122 may include a variety of sub-systems. These sub-systems may be partially or fully independent of one another or may be related. In one embodiment, each system may be included or be part of a network. In one embodiment, the gaming system/environment 122 may include a game presentation/operation system, which includes at least one game server 126. The game server 126 may comprise a computing device including a processor and a memory. The game server 126 may be adapted to perform a variety of functions. This functionality may be implemented by software and/or hardware of the server 126. In one embodiment, the game server 126 may be arranged to provide information or instructions to the one or more gaming devices 124 or individual gaming system components. The information may comprise game code and control data. In one embodiment, the game server 126 may also be arranged to accept information from the gaming devices 124 or components. For example, the game sever 126 may accept information regarding the status of operation of a particular gaming system device 124 (such as "normal" or "malfunction").

In one embodiment, the game server 126 is part of a network, which includes a communication link between the game server 126 and selected gaming system device(s) 124 and/or other component(s) with which communication is desired. A communication interface may be associated with the game server 126 and each device or component for facilitating the communication. The communication interfaces may have a variety of architectures and utilize a variety of protocols such as IEEE-1394 (FireWire™) or Ethernet in the case where the communication link is a wired link, or a wireless link utilizing a wireless protocol such as WIFI, Bluetooth™, Radio Frequency (RF), Infrared, etc. The communication links may transmit electrical, electromagnetic or optical signals, which carry digital data streams, or analog signals representing various types of information. In one embodiment, such as when the gaming device 124 comprises a gaming machine 125, the device 124 may include a master gaming controller, which controls the functions of game operation. The communication interface may be associated with the master gaming controller, permitting data to be transmitted between the game server 126 and the master gaming controller.

In one embodiment, the gaming system/environment 122 may include a player tracking system, which includes at least one player-tracking server 128. The player-tracking server 128 may also comprise a computing device including a processor and a memory. The player-tracking server 128 may be adapted to perform player-tracking functions. For example, the player-tracking server 128 may store information regarding the identities of players and information regarding the game play of those players. This information may include time of play, coin in/coin out or other monetary transaction data, and in an arrangement where players are awarded points based on play, a player's point total. Once again, the player tracking system includes a network comprising a communication link provided between the player tracking server 128 and one or more of the gaming devices 124 having a player tracking function or other components of the gaming system/environment 122 associated with the system. In one embodiment, such as where the gaming device 124 comprises a gaming machine, the device may include a management interface board, which controls a card reader. The management interface board may be arranged to receive data from the master gaming controller of the gaming system device 124. A communication interface is associated with the management interface board, permitting data to be transmitted between the player tracking server 128 and the management interface board.

In the case of table games, a card reader 129 may be associated with the table (e.g., the card reader located on or near the table game). Players may utilize the card reader to identify themselves. Information regarding play of the table game may be input through an input device by a dealer, coin counter or the like, and this information may be transmitted to the player tracking server 128.

In one embodiment, the gaming system/environment 122 may include an accounting system, which includes at least one accounting server 130. The accounting server 130 may comprise a computing device including a processor and a memory. The accounting server 130 is preferably adapted to perform financial related functions, such as track financial transactions such as bets and payouts, and perform reconciliations with monies collected from the gaming system devices 124, such as gaming machines 125, tables games 127. The accounting server 30 may be associated with a wide variety of devices, including individual gaming system devices 124 and other servers. Once again, a communication link may be provided between the accounting server 130 and each device with which communications is desired.

In one embodiment, the gaming system/environment 122 may include a progressive award system, which includes at least one progressive server 132. The progressive sever 132 may comprise a computing device including a processor and a memory. The progressive server 132 may be designed to generate progressive award information. In one arrangement, the progressive server 132 may obtain information regarding amounts bet at specific gaming system devices 124, such as gaming machines 125 or table games 127. Utilizing this information, a progressive jackpot award amount may be generated and updated using a specified protocol. The information may be transmitted to one or more displays 134 associated with participating devices 124. Once again, a communication link is preferably provided between the progressive server 132 and each device with which communications is desired. For example, a link may be provided between the progressive server 132 and accounting server 130 for providing payout information to the accounting server 130. The accounting server 130 also reads the paid amounts from the electronic gaming machines 125 as well and makes sure the paid amounts match what the progressive server claimed the paid amounts should have been. If the paid amounts don't match, then the accounting server 130 may raise a flag for further investigation by casino staff or regulators.

A physical and/or virtual information host 136 is associated with or comprises a portion of the gaming system/environment 122. In one embodiment, the host 136 comprises a computing device, which includes a processor, memory and a display. The virtual information host 136 may be one or more devices separate from devices performing other functions of the system/environment 122, or may be integrated with existing devices. The virtual information host 136 may be designed and adapted to perform functions relating to acquiring, managing, rendering, generating and/or displaying real-time and/or non real-time casino gaming system or "gaming environment" graphical information and information regarding one or more components of the gaming system or environment. Such functionality may also include the generation of at least one graphical user interface on at least one mobile device (e.g., 131), which is configured or designed to graphically display information (e.g., real-time casino information) relating to selected aspects of casino activity. Also, different graphical user interfaces may be displayed on an external application, such as on an application of a computer, smart phone, and/or on any type of mobile device 131. In one embodiment, bi-directional communication channels 121 are provided for direct, two-way communication between the host 136 and at least one game server 126 and at least one player-tracking server 128, and/or any other device with which communications is desired.

As illustrated in the example of FIG. 1, gaming system/environment 122 may also include one or more mobile devices 131 configured or designed to communicate, via one or more wireless links 111, with various components of the gaming environment 100 such as, for example: information systems (e.g., virtual information host 136); player tracking systems; accounting systems; employee management systems; location positioning systems (e.g., GPS system 133); game servers; surveillance systems; security systems; communications systems; gaming systems (e.g., gaming machines 125, game table devices 127, other mobile devices 125, etc.); etc.

Figure 2:
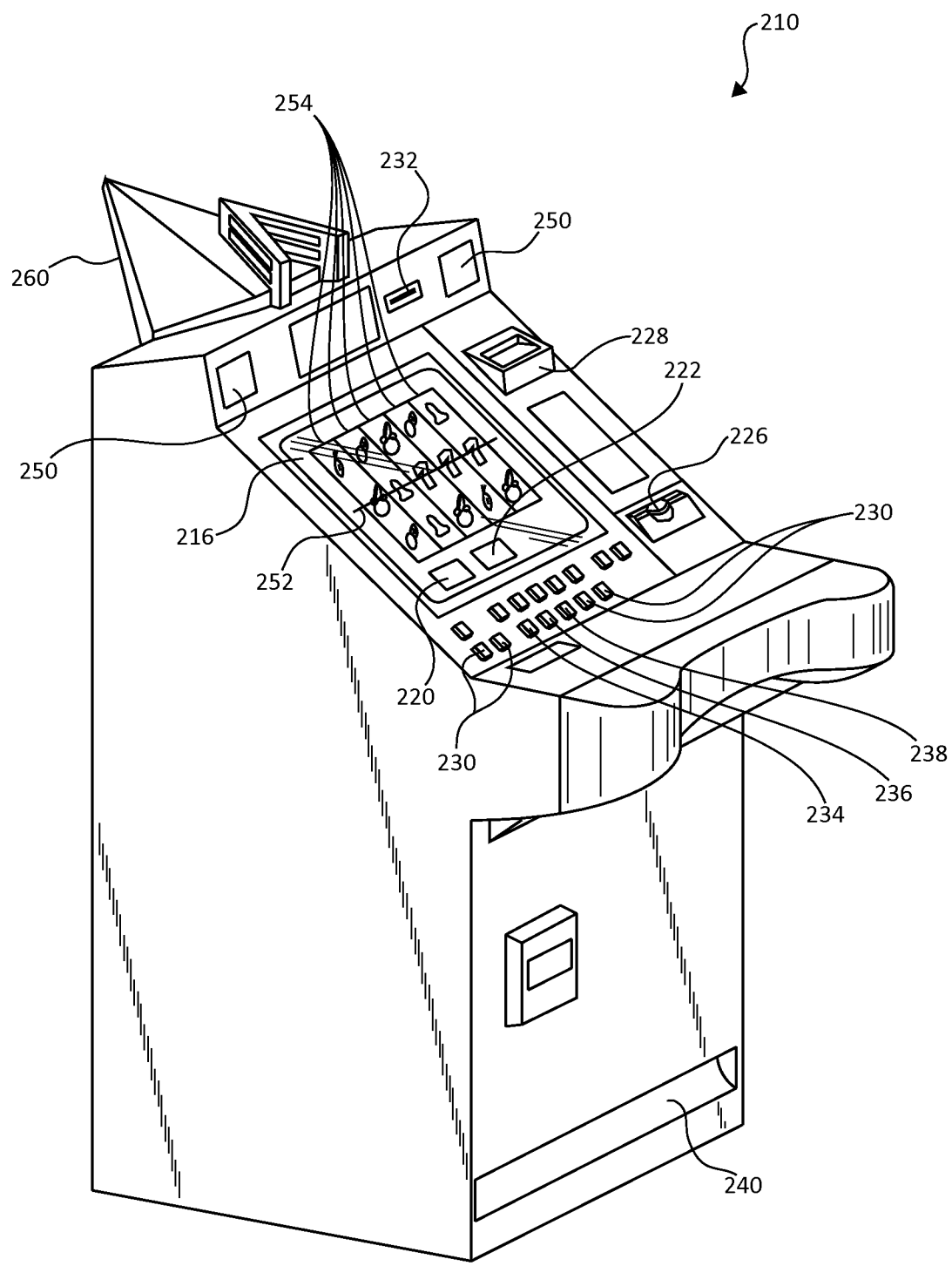
FIG. 2 is a perspective view of one embodiment of a slot machine or gaming device suitable for use in the gaming system of FIG. 1, in which aspects of the present invention may be realized.

FIG. 2 is a perspective view of one embodiment 210 of a slot machine, EGM, or gaming device suitable for use in the previously depicted system of FIG. 1, in which aspects of the present invention may be realized. FIG. 2 represents a base gaming device 210 that can be employed in the shared display system or the gaming system of the present invention is illustrated as gaming device 210. FIG. 2 illustrates features common to each of the gaming devices. In one embodiment, gaming device 210 has a support structure, housing or cabinet, which provides support for a plurality of displays, inputs, controls and other features of a conventional gaming machine. In the illustrated embodiment, the player plays gaming device 210 while sitting, however, the gaming device is alternatively configured so that a player can operate it while standing or sitting. The illustrated gaming device 210 is positioned on the floor but can be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. The gaming device 210 can be constructed with varying cabinet and display configurations. Also, referring to an embodiment for the electronic configuration of gaming device 210, each gaming device may include the components described below in FIG. 3A and FIG. 3B.

In one embodiment, each gaming device 210 randomly generates awards and/or other game outcomes based on probability data. That is, each award or other game outcome is associated with a probability and each gaming device generates the award or other game outcome to be provided to the player based on the associated probabilities. Since each gaming device 210 generates outcomes randomly or based upon a probability calculation, there is no certainty that the gaming device 210 will provide the player with any specific award or other game outcome.

In another embodiment, as discussed in more detail below, each gaming device 210 employs a predetermined or finite set or pool of awards, progressive awards, prizes or other game outcomes. As each award or other game outcome is provided to the player, the gaming device 210 removes the provided award or other game outcome from the predetermined set or pool. Once removed from the set or pool, the specific provided award or other game outcome cannot be provided to the player again. The gaming device 210 provides players with all of the available awards or other game outcomes over the course of the play cycle and guarantees a designated amount of actual wins and losses.

Figure 3A:
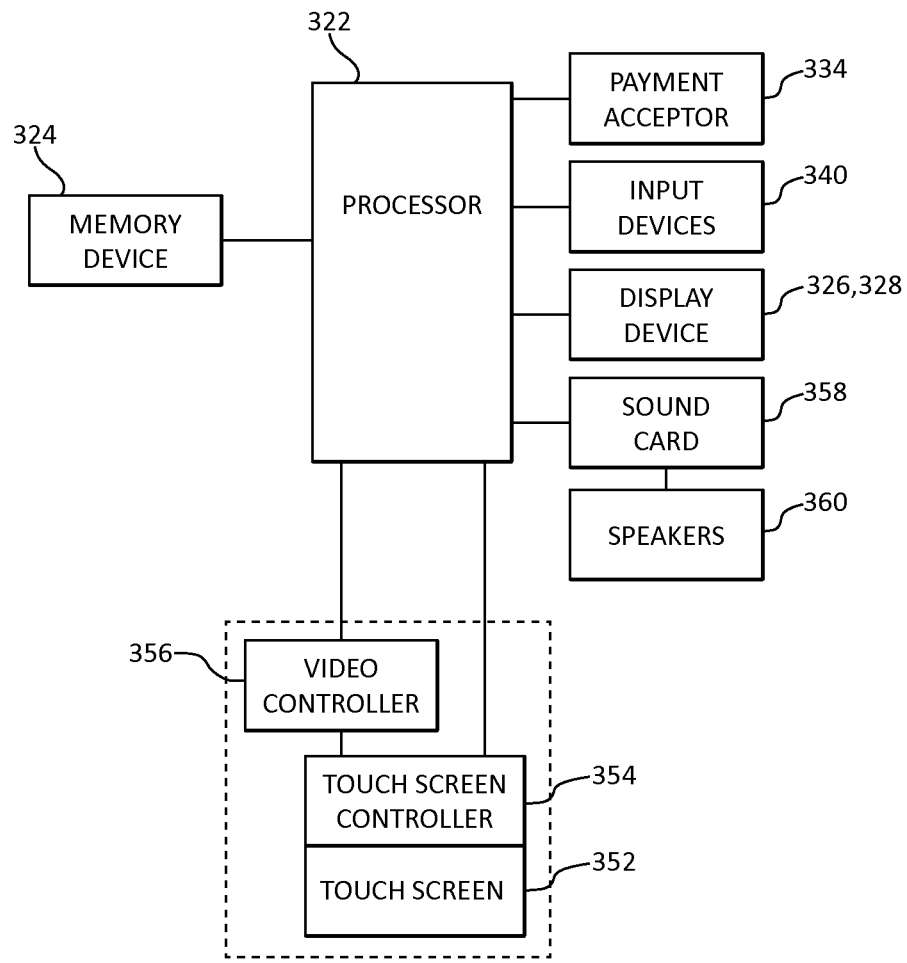
FIG. 3A is a block diagram illustrating an electronic configuration for use in the gaming device of FIG. 2, in which aspects of the present invention may be realized.

As seen in FIG. 2, the gaming device 210 includes a credit display 220 that displays a player's current number of credits, cash, account balance or the equivalent. In one embodiment, gaming device 210 includes a bet display 222 that displays a player's amount wagered. As illustrated in FIG. 3A, in one embodiment, each gaming device 210 includes at least one payment acceptor 334 (FIG. 3A) that communicates with processor 322 (FIG. 3A).

As seen in FIG. 2, the payment acceptor 334 (FIG. 3A) in one embodiment includes a coin slot 226, where the player inserts coins or tokens, and a ticket, note or bill acceptor 228, where the player inserts a bar-coded ticket, note, or cash. In one embodiment, a player-tracking card, credit card, debit card or data card reader/validator 232 is also provided for accepting any of those or other types of cards.

In one embodiment, a player inserts an identification card into card reader 232 of gaming device 210. The identification card can be a smart card having a programmed microchip or a magnetic strip coded with a player's identification, credit totals and other relevant information. In one embodiment, money may be transferred to gaming device 10 through an electronic fund transfer and card reader 232 using the player's credit, debit or smart card. When a player funds gaming device 210, processor 322 (FIG. 3A) determines the amount of funds entered and the corresponding amount is shown on the credit or other suitable display as described above. In one embodiment, after appropriate funding of gaming device 210, the player presses a play button 234 or pull arm (not illustrated) to start any primary game or sequence of events. In one embodiment, upon appropriate funding, gaming device 210 begins game play automatically. In another embodiment, the player needs to actuate or activate one of the play buttons to initiate play of gaming device 210.

As shown in FIG. 2, a bet one button 236 is provided. The player places a bet by pushing bet one button 236. The player increases the player's wager by one credit each time the player pushes bet one button 236. When the player pushes the bet one button 236, the number of credits shown in the credit display 220 decreases by one, and the number of credits shown in the bet display 222 increases by one. A max bet max button (not shown) can also be provided, which enables the player to bet the maximum wager (e.g., max lines and max wager per line). Gaming device 210 may include other suitable wager buttons 230, such as a max bet button, a repeat bet button, one or more select paylines buttons and one or more select wager per payline buttons.

In one embodiment, a cash out button 238 is provided. The player presses cash out button 238 and cashes out to receive a cash payment or other suitable form of payment corresponding to the number of remaining credits. The player can receive coins or tokens in a coin payout tray 240 or a ticket or credit slip, which are redeemable by a cashier or funded to the player's electronically recordable identification card. Each gaming device 210 also includes one or a plurality of communication ports for enabling communication of a processor with one or more external peripherals, such as external video sources, expansion buses, expansion games or other displays, an SCSI port or a key pad.

In one embodiment of FIG. 2, in combination with in FIG. 3A, a touch-screen 352 (FIG. 3A) is provided in one embodiment and operates with a touch-screen controller 354, processor 322 (FIG. 3A) and display device 326,328 (FIG. 3A). Touch-screen 352 (FIG. 3A) and the touch-screen controller 354 are also connected to a video controller 356. The player touches touch-screen 352 at appropriate places to input decisions and signals into processor 322 of gaming device 210. Also, each gaming device 210 may include a sound generating device controlled by one or more sounds cards 258, which function in conjunction with processor 322 (FIG. 3A). In one embodiment, the sound generating device includes at least one speaker 250 or other sound generating hardware and/or software for generating sounds, such as playing music for the primary and/or secondary game or for other modes of the gaming device, such as an attract mode. In one embodiment, each gaming device 210 provides dynamic sounds coupled with attractive multimedia images displayed on display device 216 to provide an audio-visual representation or to otherwise display full-motion video with sound to attract players to gaming device 210. During idle periods, the gaming device 210 displays a sequence of audio and/or visual attraction messages to attract potential players to gaming device 210. The videos in one embodiment are customized to provide information concerning the shared display of the present invention as discussed below.

In one embodiment, gaming device 210 includes a camera in communication with a processor, which is positioned to acquire an image of a player playing gaming device 10 and/or the surrounding area of gaming device 10. In one embodiment, the camera may be configured to selectively acquire still or moving (e.g., video) images and may be configured to acquire the images in either an analog, digital or other suitable format. Display device 216 may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, as illustrated in FIG. 2, a base or primary game includes a slot game with one or more paylines 252. Paylines 252 may be horizontal, vertical, circular, diagonal, angled or any combination thereof. For a slot game, gaming device 210 displays at least one reel and preferably a plurality of reels 254, such as three to five reels, in either electromechanical form with mechanical rotating reels or in video form with simulated reels and movement thereof. Each reel 254 displays a plurality of indicia such as bells, hearts, fruits, numbers, letters, bars or other images, which preferably correspond to a theme associated with the gaming device. With a slot game, gaming device 10 awards prizes when reels 254 stop spinning and display a winning or paying symbol or combination of symbols on an active payline 252.

In one embodiment, each gaming device 210 includes indicators 260. Indicators 260 reside on the top of each gaming device 10 and point to or indicate one of the awards or outcomes on top of shared display (not shown) when the shared display stops spinning to reveal randomly or otherwise generated results or outcomes. Indicators 260 may illuminate differently at different times or states for the gaming device 210. The illumination of the indicator 260 in one embodiment depends upon whether the gaming device 210 is playing a base game, is in a state in which the player is eligible to play the shared display bonus, is in a state in which the player has committed to play the shared display bonus or is in a state in which the player has declined to play a particular upcoming shared display bonus, as well as other states discussed below.

FIG. 3A is a block diagram illustrating an electronic configuration for use in the gaming device of FIG. 2, here again in which aspects of the present invention may be realized. In the embodiment illustrated in FIG. 3A the player station may include at least one processor 322, such as a microprocessor, a microcontroller-based platform, a suitable integrated circuit or one or more ASICs. The processor 322 is in communication with or operable to access or to exchange signals with at least one data storage or memory device 324. In one embodiment, the processor 322 and the memory device 324 reside within the cabinet of the player station. The memory device 324 stores program code and instructions, executable by the processor 322, to control the player station. The memory device 324 also stores other data such as image data, event data, player input data, random or pseudo-random number generators, pay-table data or information and applicable game rules that relate to the play of the player station. In one embodiment, the memory device 324 includes random access memory (RAM), which can include non-volatile RAM (NVRAM), magnetic RAM (MRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Any other suitable magnetic, optical and/or semiconductor memory may operate in conjunction with the player station and gaming system disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a hand held device, a mobile device or any other suitable wireless device that enables a player to play any suitable game at a variety of different locations. It should be appreciated that a player station as disclosed herein may be a device (e.g., EGM) that has obtained approval from a regulatory gaming commission or a device that has not obtained approval from a regulatory gaming commission. It should be appreciated that the processor and memory device may be collectively referred to herein as a "computer" or "controller."

In one embodiment, a background play feature may be available where a player, who may be sitting at the lounge and/or at the bar with friends (at the casino) may be playing a machine from the floor by remote via the external application (e.g., a smart phone). The player may substitute into the same game he wanted from an IGT online game and play, or backend the actual game though a venue network. The game may be bankrolled by the venue the player was inside. If the player was to win the player could collect from that venue where the player was located, and/or instead of "reserving" a machine he could continue the game with an auto play during a period of time the player took a break/recess. In one embodiment, a team game may be played by a group of players (e.g., a group of 3 or 4 players) and the group of players may watch and/or play the same game on each players individual external device (e.g., a computer and/or smart phone). Similarly, as described above, the team game may be played by a group of players from a remote location (e.g., bar, lounge, casino, home, office, restaurant, etc.). In one embodiment, the team game may be played by a group of players and the group of players may share credit inputs and wins. In one embodiment, the team game may be played by the group of players and the group of players may sell off and/or share double up options and/or credits to others team players of the group.

In one embodiment, as discussed in more detail below, the gaming device randomly generates awards and/or other game outcomes based on probability data. In one such embodiment, this random determination is provided through utilization of a Random Number Generator (RNG), such as a true random number generator, a pseudo random number generator or other suitable randomization process. In one embodiment, each award or other game outcome is associated with a probability and the player station generates the award or other game outcome to be provided to the player based on the associated probabilities. In this embodiment, since the player station generates outcomes randomly or based upon one or more probability calculations, there is no certainty that the player station will ever provide the player with any specific award or other game outcome. In another embodiment, each award or other game outcome is associated with a probability and the central controller or server generates the award or other game outcome to be provided to the player based on the associated probabilities. In one embodiment, each of the player stations includes an RNG and the central server controls the display of the central display. It should be appreciated there may be one or more RNG's per: (a) display segment; (b) central display; (c) player station; (d) number of games; (e) the number of potential games; or (f) any combination of the above. It should also be appreciated that one or more processors may work together and communicate to accomplish any suitable function of the gaming system.

In another embodiment, the gaming system employs a predetermined or finite set or pool of awards or other game outcomes. In this embodiment, as each award or other game outcome is provided to the player, the central controller flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

In one embodiment, as mentioned above and seen in FIG. 3A, one input device is a touch-screen 352 coupled with a touch-screen controller 354, or some other touch-sensitive display overlay to allow for player interaction with the images on the display. The touch-screen and the touch-screen controller are connected to a video controller 356. A player can make decisions and input signals into the player station by touching the touch-screen at the appropriate places. One such input device is a conventional touch-screen button panel. In another embodiment, a plurality or each of the display segments is a touch-screen 352 coupled with a touch-screen controller 354 or some other touch-sensitive display overlay to allow for player interaction with the images on the display segments. The touch-screens 352 and the touch-screen controllers 354 are connected to a video controller. The player station may further include a plurality of communication ports for enabling communication of the processor with external peripherals, such as external video sources, expansion buses, game or other displays, an SCSI port or a key pad. In one embodiment, at least one payment acceptor 324 that communicates with processor 322 for playing a bet, input devices 340, and display devices 326, 328 are provided.

The player stations, the central controller and the display segments may include serial interfaces and/or ethernet (e.g., G2S (game-to-system) protocol uses commodity Ethernet equipment and TCP/IP) to connect to specific subsystems or subnets internal and external to the player stations, central controller and the display segments. The serial devices may have electrical interface requirements that differ from the "standard" EIA serial interfaces provided by general-purpose computers. These interfaces may include EIA, EIA, Fiber Optic Serial, optically coupled serial interfaces, current loop style serial interfaces, etc. In addition, to conserve serial interfaces internally in the player station, serial devices may be connected in a shared, daisy-chain fashion where multiple peripheral devices are connected to a single serial channel.

The serial interfaces and/or ethernet (e.g., G2S (game-to-system) protocol uses commodity Ethernet equipment and TCP/IP) may be used to transmit information using communication protocols that are unique to the gaming industry. For example, SAS is a communication protocol used to transmit information, such as metering information, from a player station to a remote device. Often SAS is used in conjunction with a player tracking system. EGMs may be treated as peripheral devices to a casino communication controller and connected in a shared daisy chain fashion to a single serial interface and/or ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup. In one embodiment, as seen in FIG. 3A, the player station includes a sound generating device controlled by one or more sounds cards 358 which function in conjunction with the processor. In one embodiment, the sound generating device includes at least one and preferably a plurality of speakers 360 or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and Internet-enabled devices. In one embodiment, the game may be displayed on the central display and replicated on one or more the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain games or the win/loss history of that player. It should be appreciated that the central display and the player stations may work together with a central controller or a plurality of servers to provide the games to the player in any suitable manner.

Figure 3B:
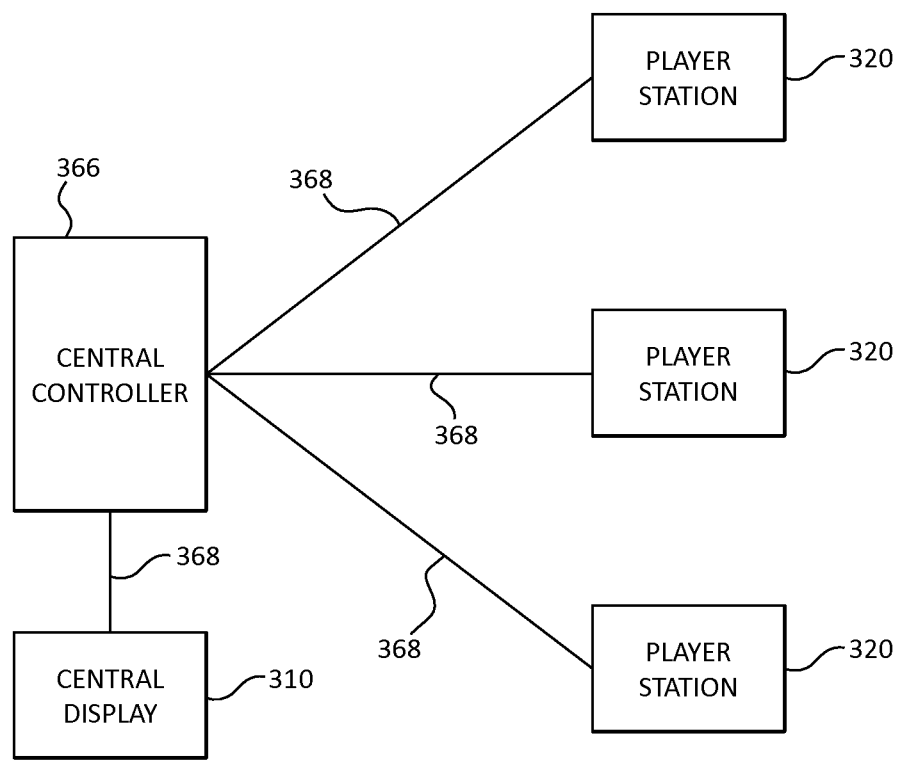
FIG. 3B is a block diagram illustrating player stations in communication with a central controller and a central display in communication with the central controller for use in the gaming device of FIG. 2, in which aspects of the present invention may be realized.

FIG. 3B is a block diagram illustrating a player station 320 in communication with a central controller and a central display 310 in communication with the central controller for use in the gaming device of FIG. 2, in which aspects of the present invention may be realized. In one embodiment, as illustrated in FIG. 3B, one or more of the player stations 320 are in communication with each other and/or at least one central server, central controller or remote host 366 through a data network or remote communication link 368. The central server, central controller or remote host is any suitable server or computing device, which includes at least one processor and at least one memory or storage device, and may also be in communication with a central display 310. In other embodiments, the central server is a progressive controller or a processor of one of the player stations in the gaming system. In these embodiments, the processor of each player station is configured to transmit and receive events, messages, commands, a current progressive value or any other suitable data or signal between the individual player station and the central server. The player station processor is operable to execute such communicated events, messages or commands in conjunction with the operation of the player station. Moreover, the processor of the central server is configured to transmit and receive events, messages, commands or any other suitable data or signal between the central server and each of the individual player stations. The central server processor is operable to execute such communicated events, messages or commands in conjunction with the operation of the central server. It should be appreciated that one or more of each of the functions of the central controller may be performed by one or more player station processors. It should be further appreciated that one, more or each of the functions of one or more player station processors as disclosed herein may be performed by the central controller. In one embodiment, the central controller has an Uninterruptible Power Supply ("UPS"). In one embodiment, the UPS is a rack mounted UPS module.

In one embodiment, the game outcome provided to the player is determined by a central server or controller and provided to the player at the player station. In this embodiment, each of the player stations is in communication with the central server or controller. Upon a player initiating game play at one of the player stations, the initiated player station communicates a game outcome request to the central server or controller. In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. The central server or controller is capable of storing and utilizing program code or other data similar to the processor and memory device of the player station. In an alternative embodiment, the central server or controller maintains one or more predetermined pools or sets of predetermined game outcomes. The central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes. The central server or controller communicates the generated or selected game outcome to the initiated player station. The player station receives the generated or selected game outcome and provides the game outcome to the player. In an alternative embodiment, how the generated or selected game outcome is to be presented or displayed to the player, such as a reel symbol combination of a player station or a hand of cards dealt in a card game, is also determined by the central server or controller and communicated to the initiated player station to be presented or displayed to the player. Central production or control can assist a gaming establishment or other entity in maintaining appropriate records, controlling gaming, reducing and preventing cheating or electronic or other errors, reducing or eliminating win-loss volatility.

In one embodiment, the player stations disclosed herein are associated with or otherwise integrated with one or more player tracking systems. In this embodiment, the player station and/or player tracking system tracks players gaming activity at the player station. In one such embodiment, the player station and/or associated player tracking system timely tracks when a player inserts their playing tracking card to begin a gaming session and also timely tracks when a player removes their player tracking card when concluding play for that gaming session. In another embodiment, rather than requiring a player to insert a player-tracking card, the player station utilizes one or more portable devices carried by a player, such as a cell phone, a radio frequency identification tag or any other suitable wireless device to track when a player begins and ends a gaming session. In another embodiment, the player station utilizes any suitable biometric technology or ticket technology to track when a player begins and ends a gaming session. During one or more gaming sessions, the player station and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. The player stations are capable of being connected together through a data network. In one embodiment, the data network is a local area network (LAN), in which one or more of the player stations are substantially proximate to each other and an on-site central server or controller as in, for example, a gaming establishment or a portion of a gaming establishment. In another embodiment, the data network is a wide area network (WAN) in which one or more of the player stations are in communication with at least one off-site central server or controller. The player stations may be located in a different part of the gaming establishment or within a different gaming establishment than the off-site central server or controller. Thus, the WAN may include an off-site central server or controller and an off-site player station located within gaming establishments in the same geographic area, such as a city or state. The WAN gaming system may be substantially identical to the LAN gaming system described above, although the number of player stations in each system may vary relative to each other.

In one embodiment, as a benefit to one or more of the gaming venues (e.g., a casino), using the player tracking system, along with use of the GPS positioning, for identifying the movements of the players throughout the gaming venues, identifying cash, money, credits, and award amounts spent along with various trends (e.g., historical) for generating visual graphs while displaying showing top view of the gaming venue (e.g., looking down from above the gaming venue) to improve casino layouts and identify patterns an movements of all types of players.

In another embodiment, the data network is an Internet or intranet. The operation of the player station can be viewed at the player station with at least one Internet browser. Operation of the player station and accumulation of credits may be accomplished with only a connection to the central server or controller (the internet/intranet server) through a conventional phone or other data transmission line, digital subscriber line (DSL), T-I line, coaxial cable, fiber optic cable, WIFI, or other suitable connection. Players may access an Internet game page from any location where an Internet connection and computer, or other Internet facilitator is available. The expansion in the number of computers and number and speed of Internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the gaming system is in communication with a central server or controller. The central server or controller may be any suitable server or computing device, which includes at least one processor and a memory or storage device. In alternative embodiments, the central server is a progressive controller or another player station in the gaming system. In one embodiment, the memory device stores different game programs and instructions, executable by a player station processor, to control the player station. Each executable game program represents a different game or type of game, which may be played on one or more of the player stations in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the player station) or vice versa.

In this embodiment, one, all or a plurality of the player stations at least includes one or more display devices and/or one or more input devices for interaction with a player. A local processor, such as the above-described player station processor or a processor of a local server, is operable with the display device(s) and/or the input device(s) of one or more of the player stations. In operation, the central controller is operable to communicate one or more of the stored game programs to at least one local processor. In different embodiments, the stored game programs are communicated or delivered by embedding the communicated game program in a device or a component (e.g., a "chip" to be inserted in a player station), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the player station. That is, when a game program is communicated to a local processor, the local processor changes the game or type of game played at the player station or displayed on the display segment. Though the illustrated embodiments are described with the central controller determining a game result for the player and communicating that result to the central display 310 and one or more player stations, any other suitable game determining method may be employed in any embodiment of the present disclosure. In one embodiment, the central display 310 is associated with a central display 310 server. This central display 310 server determines the game outcome for the games played on each of the display segments. The central display 310 server communicates the game outcome to the central controller, which communicates the game outcome to one or more of the player stations.

In one embodiment, the central controller determines the award to provide to the player based on the game outcome. In another embodiment, the player stations determine the award and/or progress jackpot/value to provide to the players based on the game outcomes. In another embodiment, the central controller determines the game outcome displayed on the central display 310 and the player station determines any award and/or progress jackpot/value to provide to the player based on the game outcome. The player station determines both the game outcome and any award to provide to the player based on the game out come. In another embodiment, the central controller determines part of the outcome and the player station determines part of the outcome. That is, both the central controller and the player station determine part of a player's outcome and/or award.

Further, in the gaming industry, many different manufacturers make gaming machines and player stations. The communication protocols on the player station may be hard-wired into the player station and each player station/gaming machine manufacturer may utilize a different proprietary communication protocol. A player station manufacturer may also produce host systems, in which case their player stations are compatible with their own host systems. However, in a heterogeneous gaming environment, player stations from different manufacturers, each with its own communication protocol, may be connected to host systems from other manufacturers, each with another communication protocol. Therefore, communication compatibility issues regarding the protocols used by the player stations in the system and protocols used by the host systems must be considered.

In another embodiment, player stations at one or more gaming sites may be networked to a central server in a progressive configuration, wherein a portion of each wager to initiate a base or primary game may be allocated to bonus or secondary event awards. In one embodiment, a host site computer is coupled to central servers at a variety of mutually remote gaming sites for providing a multi-site linked progressive automated gaming system. The host site computer may serve player stations distributed throughout a number of properties at different geographical locations including, for example, different locations within a city or different cities within a state. The host site computer may be maintained for the overall operation and control of the system. A host site computer may oversees the entire progressive gaming system and may be the master for computing all progressive jackpots and values for each and every gaming device. All participating gaming sites report to, and receive information from, the host site computer. Each central server computer may be responsible for all data communication between the player station hardware and software and the host site computer. An individual player station may trigger a progressive win, for example through a game play event such as a symbol-driven trigger in the multi-component game. The central server or other central controller determines when a progressive win is triggered. The central controller and an individual player station may work in conjunction with each other to determine when a progressive win is triggered, for example through an individual player station meeting a predetermined requirement established by the central controller. The progressive award win may be triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a player station is randomly or apparently randomly selected to provide a player of that player station one or more progressive awards. In one such embodiment, the player station does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game. In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards).

In one such embodiment, the greater the players' wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner. In another embodiment, one or more of the progressive awards are partially funded via a side-bet or side-wager, which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In one alternative embodiment, a minimum wager level is required for a player station to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, players at a linked player stations in a gaming system participate in a group gaming environment. In one embodiment, players at linked player stations work in conjunction with one another, such as playing together as a team or group, to win one or more awards. In one such embodiment, any award won by the group is shared, either equally or based on any suitable criteria, amongst the different players of the group. In another embodiment, players linked player stations compete against one another for one or more awards. In one such embodiment, players at linked player stations participate in a gaming tournament for one or more awards. In another embodiment, players at linked player stations play for one or more awards wherein an outcome generated by one player station affects the outcomes generated by one or more linked player stations.

Figure 4:
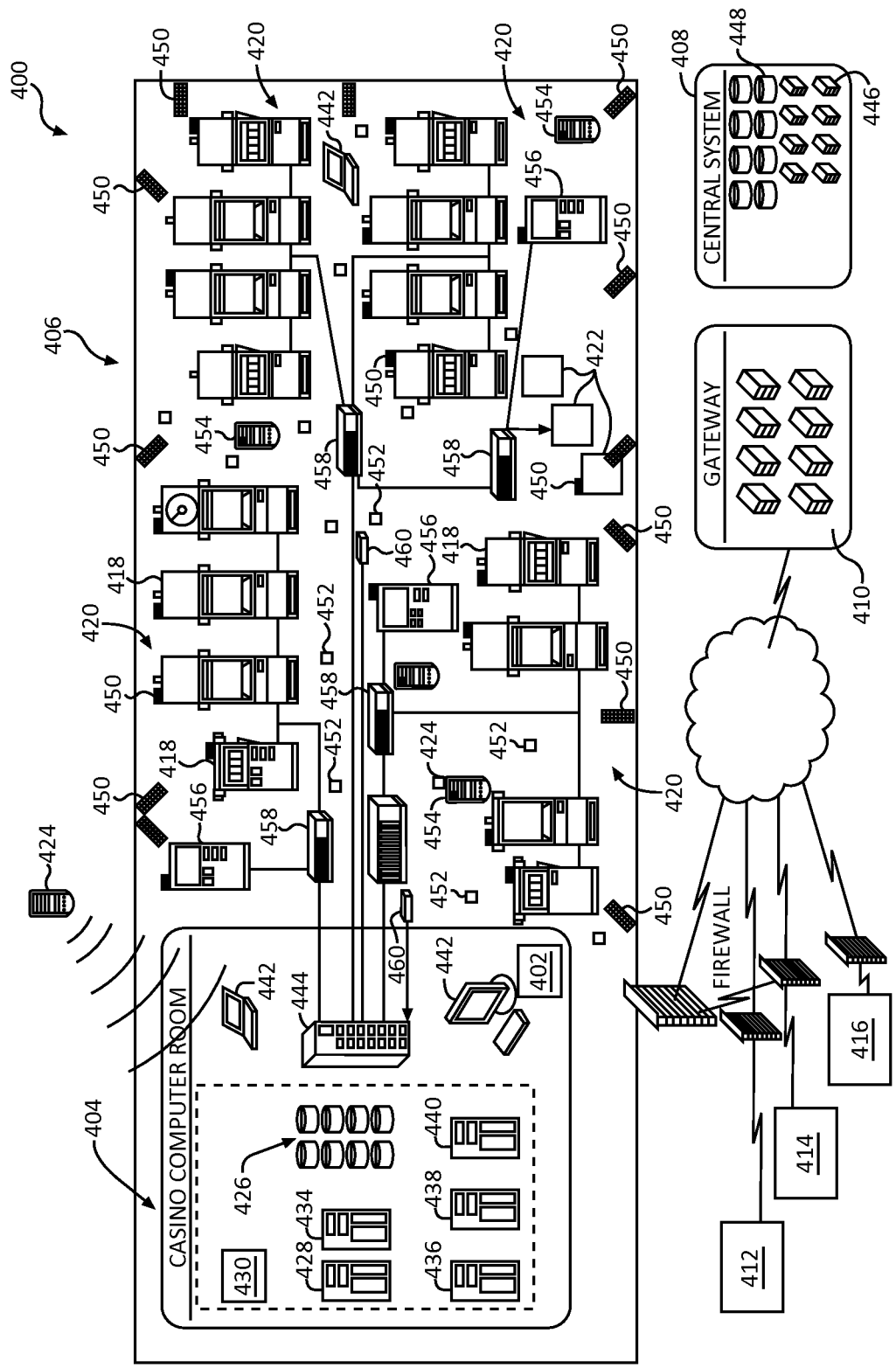
FIG. 4 is a schematic block diagram of a server-based gaming network in which aspects of the present invention may be realized.

FIG. 4 is a schematic block diagram of a server-based gaming network 400 in accordance with an exemplary embodiment of the present invention. In the exemplary embodiment, network 400 includes a slot floor mix recommendation system 402 incorporated therein. In one embodiment, slot floor mix recommendation system 402 is a stand alone system communicatively coupled to network 400. In various embodiments, slot floor mix recommendation system 402 is incorporated within various components of network 400. Network 400 provides methods and devices for managing one or more networked gaming establishments. Network 400 may be embodied in what is known as a server-based gaming network, sbX™ network. For example, in one embodiment, a host may be included in the network, such as a server-based gaming network. For example, a gaming server (e.g., an sbX™ server) may be an example of the host. The gaming server (e.g., the sbX™ server) may be a set of servers running central applications and may attach as the host to EGMs via the gaming network. In one embodiment, a host, operating in the gaming network, may be a server (e.g., an sbX™ server) managing and controlling the gaming network (e.g., an sbX™ network). In one embodiment, the host, operating in the gaming network, may monitor the monetary activity of the EGM. The host may track any error conditions on the EGM. The host may configure the EGM such as to enable/disable games, download games, and configure game parameters (denomination, payback, etc.). For example, a gaming management solution (e.g., IGT® sbX™ gaming management solution) may be a server-based system to act as a repository for all game content that may be downloaded to EGMs giving each EGM instant access to the technology within the EGM's environment. The game software, random number generator and game logic are controlled by the EGM. This significantly increases configuration speed so that games may be adapted and seamlessly integrate analytics to the database in minutes. Game titles are accessed from the server using a floor manager (e.g., IGT Floor Manager®), running on the host, and allow operators to reconfigure their gaming floor almost instantly. In one embodiment, the floor manager, operating on the host, is a G2S-compliant game-to-system management solution that enables operators to remotely change the game mix on the casino floor. In one embodiment, the floor manager application provides operators with sophisticated and user-friendly visualization tools to analyze terminal (e.g., the EGM) and game performance in real-time. Using Quick Change functionality (QCF), the floor manager, running on the host server(s), enables operators to rapidly locate low performing games, select a new theme from the game library and download the new theme on the EGM in the gaming venue floor within minutes. The software displays a map of the casino floor and highlights EGMs color-coded to indicate performance. Operators can select individual terminals and receive analysis at terminal-, multi-game and single-game level, based on KPIs such as coin-in, actual win and occupancy of game. In one embodiment, the floor manager application is a gateway to a game-to-system library allowing operators to quickly schedule changes or switch between themes. Once selected, the game's configurations can be set including denomination, max bet and even volume and credit limits on the EGM. For example, new gaming industry-leading themes may be added to the game library every month and the floor manager application provides rapid deployment to the gaming floor to ensures an EGM will maintain high performance and continually provide the user with newer and advanced games to add to the users favorite and/or preferred games. In one embodiment, the quick recognition and eradication of low performing games and ability to respond to consumer requests on the floor, empowers a gaming venue to concentrate on player satisfaction and gaming experience.

In addition, with the sbX™ gaming management, as each EGM connected to the system is self-sufficient, if there is a malfunction or connectivity fault, information is backed up at the individual EGM for a predetermined period of time (e.g., two weeks), ensuring no data loss. Once the problem is resolved and the EGM is re-connected to a server, the backed-up data is instantly dropped into the database. Operators now have the ability to run their own choice of games on any interconnected terminal in the gaming venue. This allows management to switch between games at any time, delivering an unmatched level of flexibility and control over their gaming environment. Users are also able to select the games (e.g., a favorite and/or preferred EGM) and denominations they wish to play at the terminal. In one embodiment, the sbX™ gaming management system delivers a flexible and diversified approach to management and control of the casino floor, reconfiguring gaming machines at the appropriate time and schedule. For example, in one embodiment, all EGMs connected to the server are granted full access to themes held in a games depository and operators can reconfigure each terminal remotely from the workstation. A Games Library may be included and may contain over 300 gaming titles in a game-to-system depository. In one embodiment, the sbX™ gaming management application allows for games to be updated in minutes and with this simple configuration process in place, operators can place better focus on in-depth player statistics. Accurate information in real-time optimizes marketing strategies, to provide the ultimate gaming experience and ensure the floor remains dynamic. Instantaneous analysis and decisions may be implemented to adjust elements and increase user satisfaction and loyalty. This also enables a gaming venue to ensure users are able to play the latest content available. Various game themes can be changed, tested and reverted in different areas of the gaming venue with rapid execution. In one embodiment, the sbX™ application and its integrated modules provide for data analysis and also focus on player experience thereby allowing for the development of innovative marketing programs. For example, in one embodiment, certain banks of machines may be adapted to a featured game, linked to a proprietary progressive jackpot and then heavily promoted during certain times. Thus, these games may become a favorite and preferred EGM during a particular time. Following the promotion, the EGMs can quickly be restored to their original games. In one embodiment, the sbX™ system may be driven by IGT's Advanced Video Platform (AVP®) with the technology seamlessly integrated with all modules, permitting fast connectivity and advanced capabilities. In addition, GSA open protocols are used so that sbX™ applications are interoperable with third-party devices that have also adopted GSA open protocols.

Thus, in one embodiment, if a demand for a particular type of the EGM is in high demand (e.g., multiple users are selecting a favorite and/or preferred game on a particular EGM) but the supply of the favorite and/or preferred game on a particular EGM is low, the floor manager application provides the ability to quickly (e.g., within minutes) update and replace the EGM's having low performing games and/or non-preferred games on the EGM with the higher performing and/or favorite and preferred game on a particular EGM.

In one embodiment, network 400 permits the convenient provisioning of networked gaming machines and other devices relevant to casino operations. Game themes may be easily and conveniently added or changed, if desired. Related software, including but not limited to player tracking software and peripheral software may be downloaded to networked gaming machines, mobile gaming devices, thin clients and/or other devices, such as kiosks, networked gaming tables, player stations.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations, such as interim and final game outcomes and bonuses, may be made by one or more servers or other networked devices. Player tracking functions, accounting functions and some display-related functions associated with wagering games may be performed, at least in part, by one or more devices of a casino network and/or of a central system.

In the exemplary embodiment, network 400 includes a casino computer room 404 and networked devices of a gaming establishment 406. Gaming establishment 406 is configured for communication with a central system 408 via a gateway 410. Other gaming establishments 412, 414, and 416 are also configured for communication with central system 408.

Gaming establishment 406 includes multiple gaming machines 418. Some of gaming machines 418 form a cluster or "bank" 420 of gaming machines 418. Gaming machines 418 are configured for communication with one or more devices of casino computer room 404 or similar devices disposed elsewhere in gaming establishment 406. Some of gaming machines 418 may be configured to read from, and/or write information to, a portable instrument such as but not limited to, a ticket and a player loyalty device. In one embodiment, gaming establishment 406 also includes a bank of networked gaming tables 422. However, network 400 may be implemented in gaming establishments having any number of gaming machines, gaming tables, etc. It will be appreciated that many gaming establishments 406 include hundreds or even thousands of gaming machines 418, gaming tables 422 and/or mobile devices 424, not all of which are necessarily associated bank 420 and some of which may not be connected to network 400. At least some of gaming machines 418 and/or mobile devices 424 may be "thin clients" that are configured to operate, at least in part, according to instructions from another device (such as a server).

Multiple storage devices 426, sbX™ server 428, License Manager 430, servers 434, 436, 438, and 440, host device(s) 442, and main network device 444 are disposed within computer room 404 of gaming establishment 406. In practice, more or fewer devices may be used. Depending on the implementation, some such devices may reside elsewhere in gaming establishment 406.

One or more of the devices in computer room 404 (or similar devices disposed elsewhere in gaming establishment 406 or in gaming establishment 412, 414, or 416) may be configured to provide functionality relevant to embodiments of the present invention. For example, one or more of servers 434, 436, 438, or 440 may be configured for communication with gaming machines 418 that are configured to provide a subset of themes for selection by a player. For example, one or more such servers may be configured to provide a selection of a subset of four themes from a large number of available themes.

Accordingly, in some embodiments at least some gaming establishments may be configured for communication with one another. In this example, gaming establishments 412, 414, and 416 are configured for communication with casino computer room 404. Such a configuration may allow devices and/or operators in casino 406 to communicate with and/or control devices in other casinos. In some such implementations, a server (or another device) in computer room 404 may be configured to communicate with and/or control devices in gaming establishments 412, 414, and 416. Conversely, devices and/or operators in another gaming establishment may communicate with and/or control devices in casino 406.

Some of these servers in computer room 404 may be configured to perform tasks relating to accounting, player loyalty, bonusing/progressives, configuration of gaming machines, etc. A Radius server and/or a DHCP server may also be configured for communication with the gaming network. In various embodiments, sbX™ server 428 and the other servers shown in FIG. 4 include or are in communication with clustered CPUs, redundant storage devices, including backup storage devices, switches, etc. Such storage devices may include a redundant array of independent disks (RAID) array, back-up hard drives and/or tape drives, etc.

In various embodiments, many of these devices (including but not limited to License Manager 430, servers 434, 436, 438, and 440, and main network device 444) are mounted in a single rack with sbX™ server 428. Accordingly, many or all such devices will sometimes be referenced in the aggregate as an "sbX™ server." However, in alternative implementations, one or more of these devices is in communication with sbX™ server 428 and/or other devices of the network but located elsewhere. For example, some of the devices could be mounted in separate racks within computer room 404 or located elsewhere on the network. Moreover, in some implementations large volumes of data may be stored elsewhere, e.g., via a storage area network ("SAN").

Computer room 404 may include one or more operator consoles or other host devices that are configured for communication with other devices within and outside of computer room 404. Such host devices may be provided with software, hardware and/or firmware for implementing functions described herein. However, such host devices need not be located within computer room 404. Wired host devices 442 (which are desktop and laptop computers in this example) and wireless devices 424 (which are PDAs in this example) may be located elsewhere in gaming establishment 406 or at a remote location.

Some embodiments include devices for implementing access control, security and/or other functions relating to the communication between different devices on the network. One or more devices in central system 408 may also be configured to perform, at least in part, tasks specific to embodiments of the present invention. For example, one or more servers 446, storage devices and/or host devices 442 of central system 408 may be configured to implement the functions described in detail elsewhere herein. One or more servers 446, storage devices 448 and/or host devices 442 of central system 408 may maintain player account information.

Some gaming networks 400 provide features for gaming tables that are similar to those provided for gaming machines, including but not limited to bonusing, player loyalty/player tracking, the use of cashless instruments, etc. Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras 450, radio frequency identification devices 452 and 454, etc., may be used to identify and/or track patrons, playing cards, chips, etc. Some of gaming tables 422 may be configured for communication with individual player terminals (not shown), which may be configured to accept bets, present an electronic representation of a dealer, indicate game outcomes, etc.

Moreover, some such automated gaming tables 422 and/or associated player terminals may include, or may be configured for communication with, a device that includes a coin-out meter, a ticket reader, a card reader, a ticket printer, and/or other related features. In some implementations, one such device may provide such functionality to a plurality of automated gaming tables 422 and/or associated player terminals.

Gaming establishment 406 also includes networked kiosks 456. Kiosks 456 may include card readers, ticket readers, printers, a user interface system, one or more displays, etc. Depending on the implementation, kiosks 456 may be used for various purposes, including but not limited to cashing out, prize redemption, redeeming points from a player loyalty program, redeeming "cashless" indicia such as bonus tickets, smart cards, etc.

Kiosks 456 may be configured to read information from, and/or write information to, a portable instrument such as a smart card, a ticket, a card having a magnetic strip, etc. The corresponding gaming devices are preferably configured for communication with such kiosks 456 and vice versa. Accordingly, some such kiosks 456 may include a wireless interface that is configured for communication with mobile gaming devices 424.

In the exemplary embodiment, each bank 420 has a corresponding switch 458. Each switch 458 is configured for communication with one or more devices in computer room 404 via main network device 444, which combines switching and routing functionality in this example. Although various communication protocols may be used, some preferred implementations use the Gaming Standards Association's G2S Message Protocol. Some systems may use a gaming-industry-specific transport layer called CASH™, which offers additional functionality and security.

Gaming establishment 406 may also include an RFID network, implemented in part by RFID switches 460 and multiple RFID readers 452. An RFID network may be used, for example, to track objects such as mobile gaming devices 424, which include RFID tags 454, patrons, chips, player loyalty devices, etc., in the vicinity of gaming establishment 406.

Various alternative network topologies can be used to implement different aspects of the invention and/or to accommodate varying numbers of networked devices. For example, some gaming establishments may include cameras 450 for implementing advanced player tracking, player navigation or other functionality. Gaming establishments with large numbers of gaming machines 418 may require multiple instances of some network devices (e.g., of main network device 444, which combines switching and routing functionality in this example) and/or the inclusion of other network devices not shown in FIG. 4. Some embodiments may include one or more middleware servers disposed between kiosks 456, RFID switches 460 and/or bank switches 458 and one or more devices (e.g., a corresponding server, router or other network device) in computer room 404. Such middleware servers can provide various useful functions, including but not limited to the filtering and/or aggregation of data received from switches, from individual gaming machines and from other devices. Some implementations of the invention include load-balancing methods and devices for otherwise managing network traffic.

In one embodiment, using the embodiments described herein, a Personal Electronic Devices (PED) and/or other type of an external application (e.g., mobile application, web application, and the like) may be used to transfer money to and from the EGM employing a service window application, and the PED may use a variety of communication protocols such as near field communication (NFC), Bluetooth or other wireless communications to transfer money to and from the EGM, particularly using the information window (e.g., a service window) of the EGM, which may be operated by and/or in communication with an sbX™ server 428, central system 408, servers 446, a main network device 444, storage devices and/or host devices 442 of central system 408 may be configured to implement the functions described in detail elsewhere herein) and/or via the external application. The money of a player may come from any type of financial institution (e.g., a bank) or a player wagering account of a gaming venue. In one embodiment, the wireless communication may go directly to the processing unit on a particular and identified EGM being in communication with and/or controlled by a sbX™ server 428, central system 408, servers 446, a main network device 444, storage devices and/or host devices 442 of central system 408 may be configured to implement the functions described in detail elsewhere herein. The EGM may be configured with a hardware device (e.g., those described in FIG. 4) that communicates with the PED. The EGM, using a service window application, may contain a device that communicates with a bill acceptor or printer to simulate bills and tickets. The EGM may have a device (software and/or hardware) that communicates with a back end host that ultimately uses SAS or G2S to move the money to and from the particular and identified EGM. This configuration allows all of EGMs to be retrofitted for mobile payments.

In one embodiment, when an actual wireless transfer occurs via a mobile device, money is electronically moved virtually from an identified and/or a preferred EGM employing the service window application to the PED or vice versa. The transfer process asks the player to trust the new technology in order to gain a players confidence due to this lack of trust. In this way, the players trust is gained and an audit trail is provided by the service window application controlled by and/or in communication with the sbX™ server 428, the central system 408, servers 446, the main network device 444, storage devices and/or host devices 442 of central system 408 to implement the present invention described herein. An email or text can be sent via the EGM, the sbX™ server 428, the central system 408, servers 446, the main network device 444, and/or storage devices and/or host devices 442 of central system 408 with the details of the transfer. In one embodiment, the player may cash out to their PED and then immediately receive and view an email on the PED indicating that the transfer occurred from an EGM. The transfer verification email may provide all of the details (date, time, amount, EGM, the gaming venue location, and/or property, etc.) regarding the monetary transfer. The email may be sent for transfers to and from the EGM employing the service window application.

The transfer verification message may be used for performing, authenticating, and preventing fraud of the mobile transfer of the money to and from the EGM employing the service window application in communication with the sbX™ server 428, the central system 408, servers 446, the main network device 444, storage devices and/or host devices 442 of central system 408 to implement the present invention described herein. In one embodiment, each EGM may have specific and unique identifiers, which may be displayed in the service window application, and this identifying information of the EGM may be included in the transfer verification message sent via the sbX™ server 428, the central system 408, servers 446, the main network device 444, and/or host devices 442 of central system 408 described herein. Moreover, the transfer verification message may include any and all information that is used and displayed in the service window, and be associated with a players account information, the EGM, a geolocation information of the EGM (e.g., the physical location of the EGM in a gaming venue), serial numbers of the EGM, biometric data (e.g., a fingerprint taken from the PED, the EGM, and/or other location, and uploaded, verified, included with the transfer verification message), geolocation information of the mobile device, banking account information, information regarding a bank level/bank of EGM's, and/or other verifiable data relating to the EGM and money transfer to be included in the transfer verification message associated with the money transfer. In one embodiment, each EGM may have specific and unique identifiers, and this identifying information of the EGM may be included in the transfer verification message sent via the sbX™ server 428, the central system 408, servers 446, the main network device 444, and/or host devices 442 of central system 408 described herein.

In one embodiment, prior to completing the mobile transfer payment, the transfer verification message requires the player to respond back to the request, using the sbX™ server 428, the central system 408, servers 446, the main network device 444, and/or host devices 442 of central system 408 described herein, for approval of the mobile payment transfer from the player. Upon responding back to the request for approval of the mobile payment transfer, the mobile payment is electronically transferred from the EGM, employing the service window application, using the sbX™ server 428, the central system 408, servers 446, the main network device 444, and/or host devices 442 of central system 408 described herein, to the financial institution and/or player account, and/or electronically transferred from the financial institution and/or player account to the EGM via the mobile device. In one embodiment, the request for approval requires the data included in the transfer verification message to be verified and/or validated by the player. The transfer verification message may include a confirmation number for the mobile payment transfer.

Figure 5:
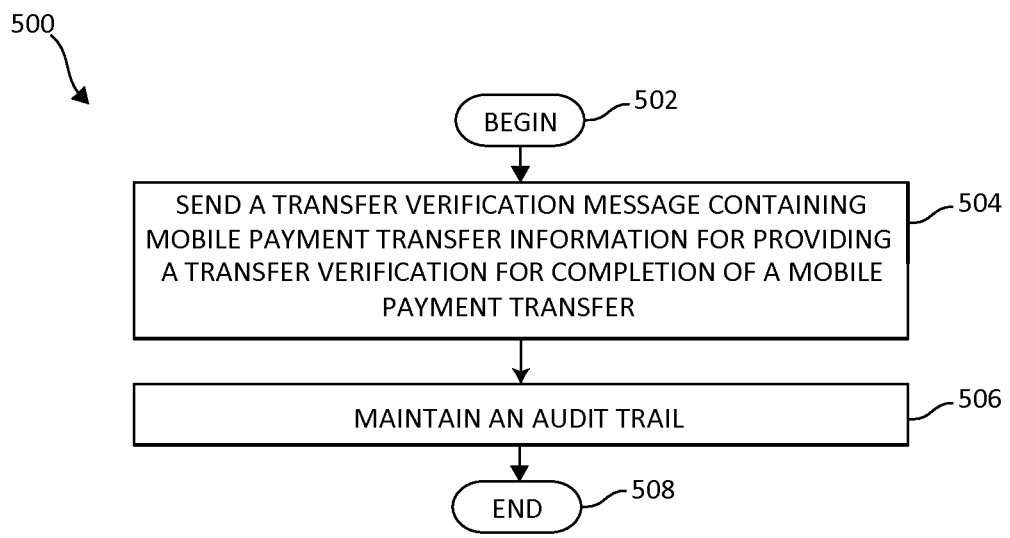
FIG. 5 is a flow chart illustrating an exemplary method for transfer verification of mobile payments in a gaming system in which aspects of the present invention may be realized.

FIG. 5 is a flow chart illustrating an exemplary method 500 for transfer verification of mobile payments in a gaming system in which aspects of the present invention may be realized. The method 500 begins (step 502) by sending a transfer verification message containing mobile payment transfer information for providing transfer verification for completion of a mobile payment transfer (step 504). The method 500 maintains an audit trail (step 506). The method 500 ends (step 508).

Figure 6:
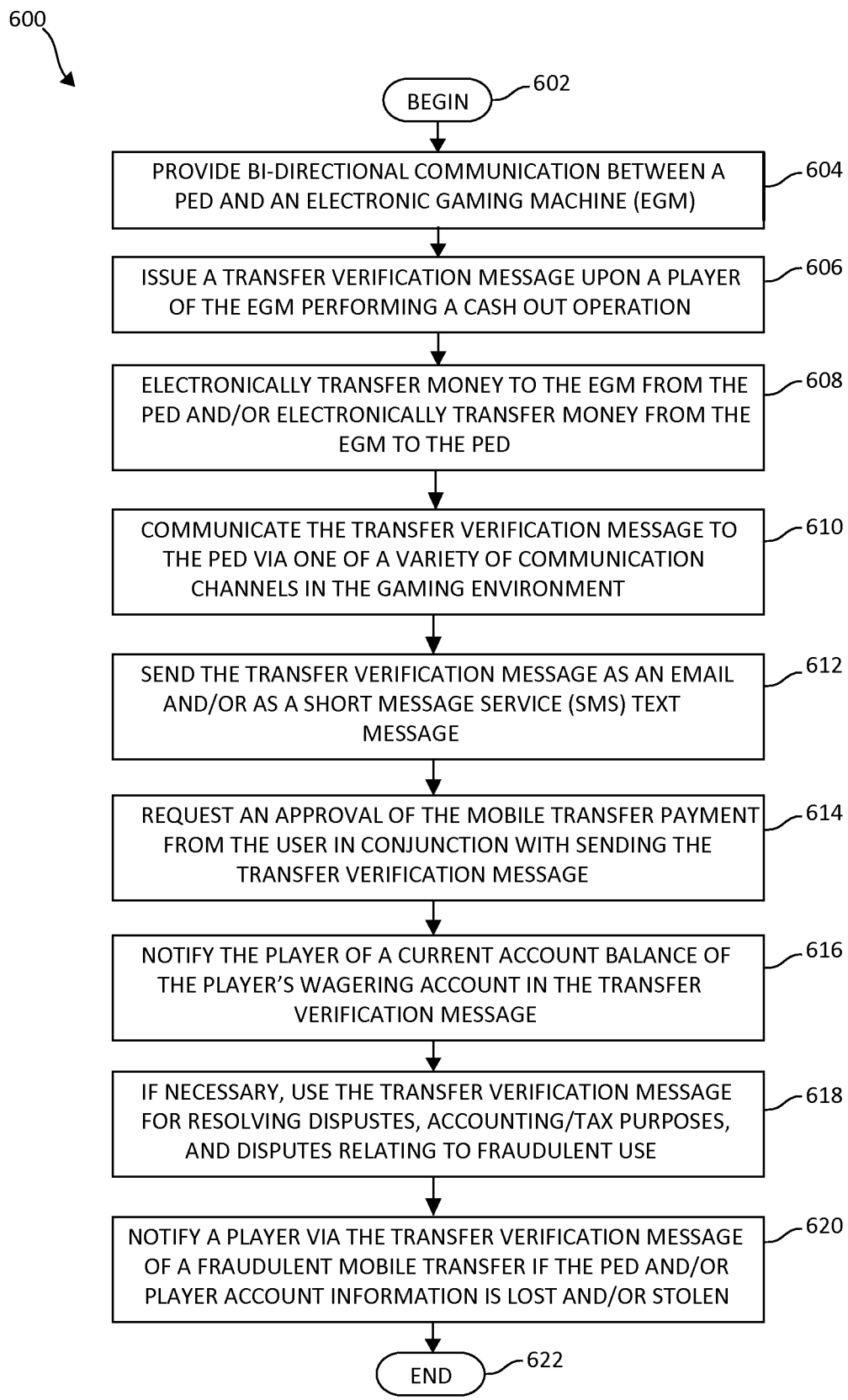
FIG. 6 is a flow chart illustrating an exemplary alternative method for transfer verification of mobile payments in a gaming system in which aspects of the present invention may be realized.

FIG. 6 is a flow chart illustrating an exemplary alternative method 600 for transfer verification of mobile payments in a gaming system in which aspects of the present invention may be realized. The method 600 begins (step 602) by providing bi-directional communication between personal electronic device (PED) and an electronic gaming machine (EGM) (step 604). The method 600 issues the transfer verification message upon a player of a gaming device performing a cash out operation (step 606). The method 600 electronically transfers money to an electronic gaming machine (EGM) from the PED and/or electronically transferring money to the PED from the EGM (step 608). Money from a financial institution and/or a player wagering account is used for the mobile payment transfer. The method 600 communicates the transfer verification message to personal electronic device (PED) via one of a plurality of communication channels in a gaming/networking environment (step 610). The transfer verification message is used for verifying, validating, approving, and/or performing the mobile transfer to and from an electronic gaming machine (EGM). The method 600 sends the transfer verification message as an email and/or as a short message service (SMS) text message (step 612). In conjunction with the transfer verification message, the method requests an approval of the mobile payment transfer from the player (step 614). The method 600 notifies the player of a current account balance of the player's wagering account in the transfer verification message (step 616). If necessary, the method 600 uses the transfer verification message for resolving disputes relating to the mobile payment transfer, accounting and taxing related purposes, and/or disputing fraudulent use of a personal electronic device (PED) (step 618). If a personal electronic device (PED) and/or a player account information is lost and/or stolen, the method 600 notifies a player via the transfer verification message of a fraudulent mobile transfer (step 620). The method 600 ends (step 622).

Turning now to FIG. 7A-F, schematic block diagrams are illustrated of an electric application device using biometric technology for gaining secured access to a server-based gaming network is depicted. In one embodiment, the electric application device (e.g., a biometric sensor and/or an electronic device that is in communication with a bionic sensor, and/or an electronic device that has biometric sensor technology capabilities) detects a request for authenticating user/player identity. The electronic devices may be a biometric sensor, smart phone, an electronic tablet, a computer, a cellular phone, a portable phone, a media player, a personal data organizer, a handheld game platform, a tablet computer, a notebook computer, or any combination of such devices. The biometric device may be a fingerprint scanner, a retinal scanner, voice recorder, recognition device, camera, image reader, and/or any device that captures biometric information that allows for identification based on unique characteristics, including but not limited to, fingerprint scans, iris scans, and voice recognition. In one embodiment the biometric devices utilize technology to capture and process this type of information in a server-based gaming sbX™ network of a gaming venue governed by a gaming commission.

Figure 7A:
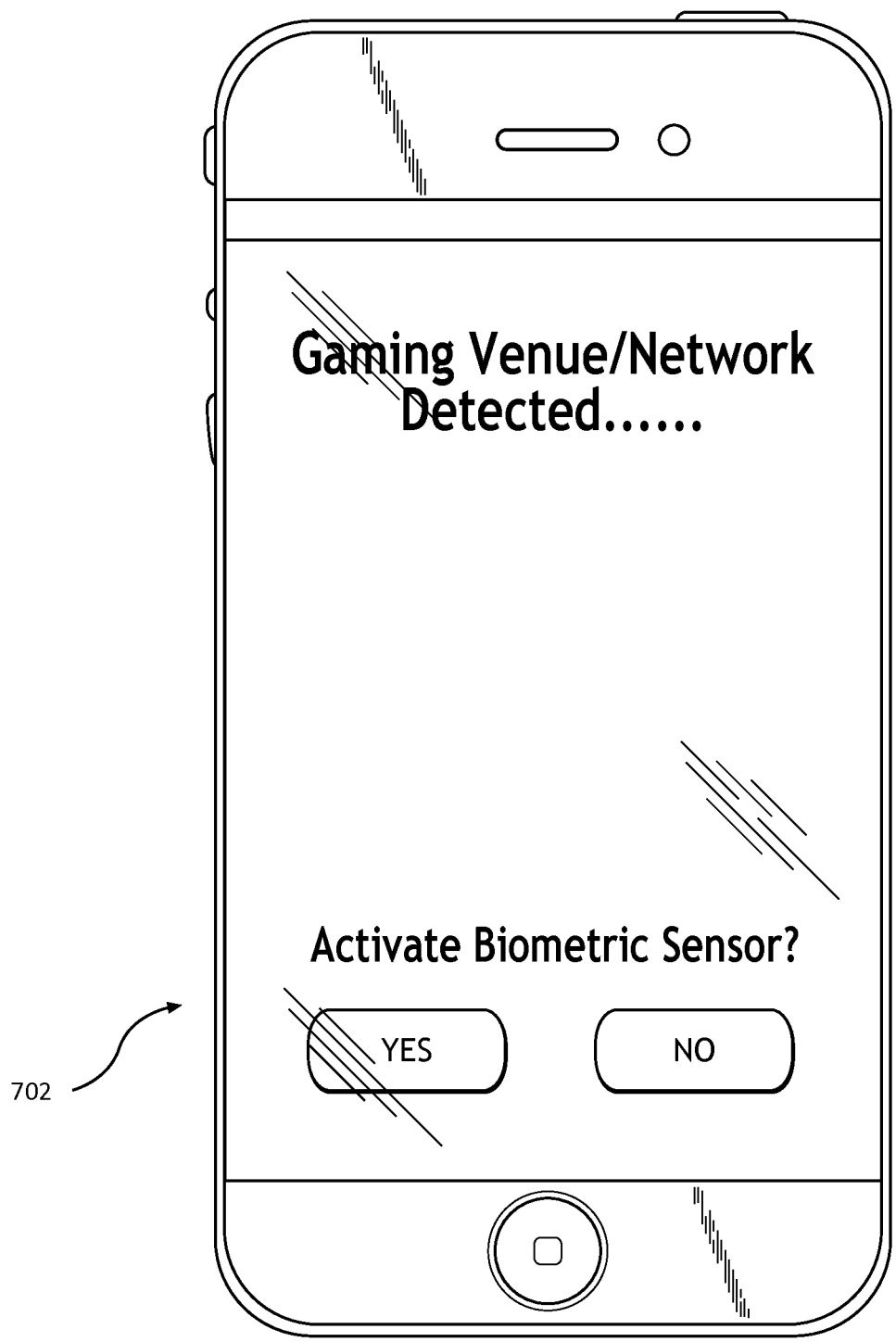
FIG. 7A-F are schematic block diagrams illustrating an electric application device using biometric technology for gaining secured access to a server-based gaming network in which aspects of the present invention may be realized.
Figure 7B:
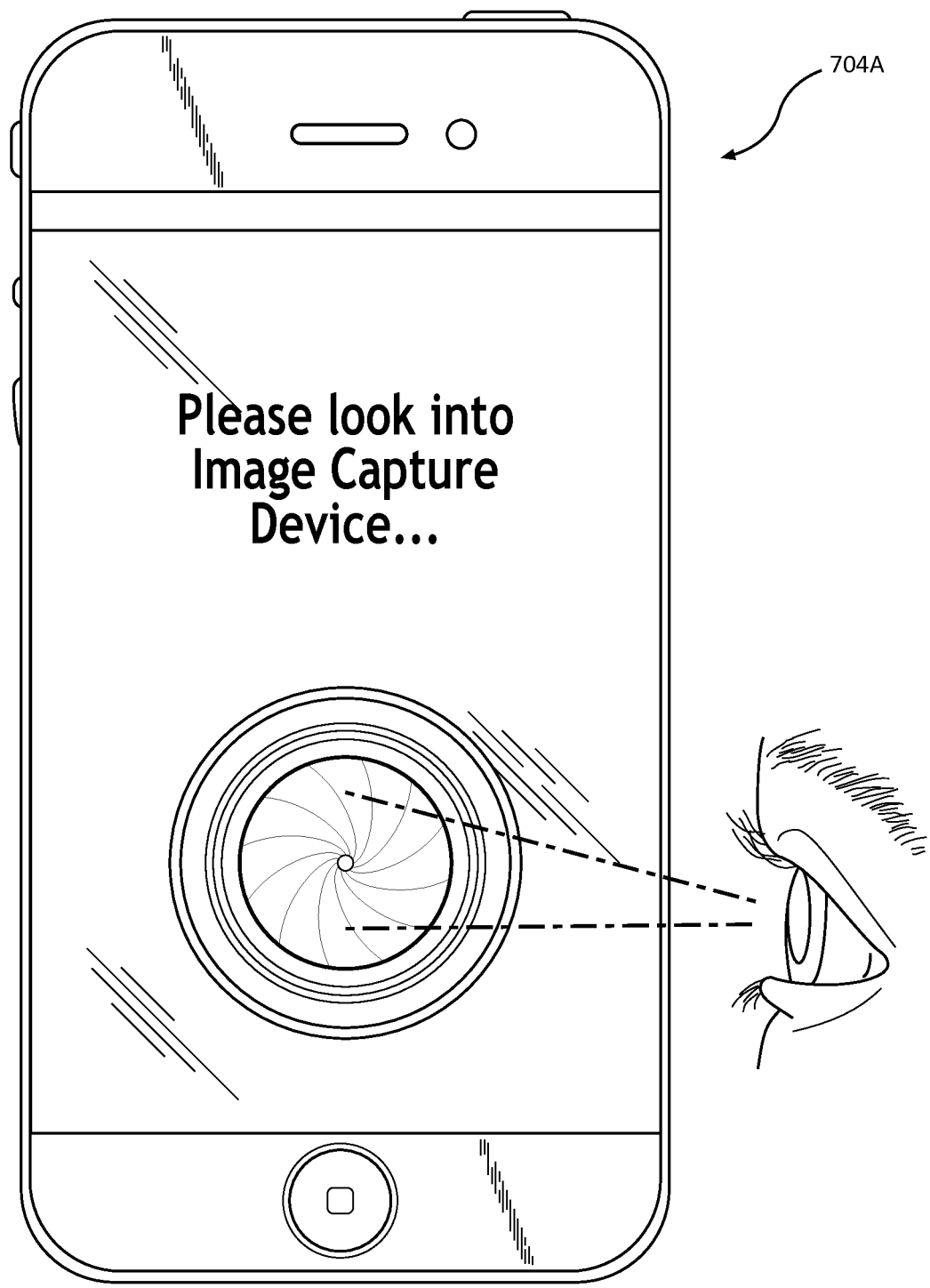
Figure 7C:
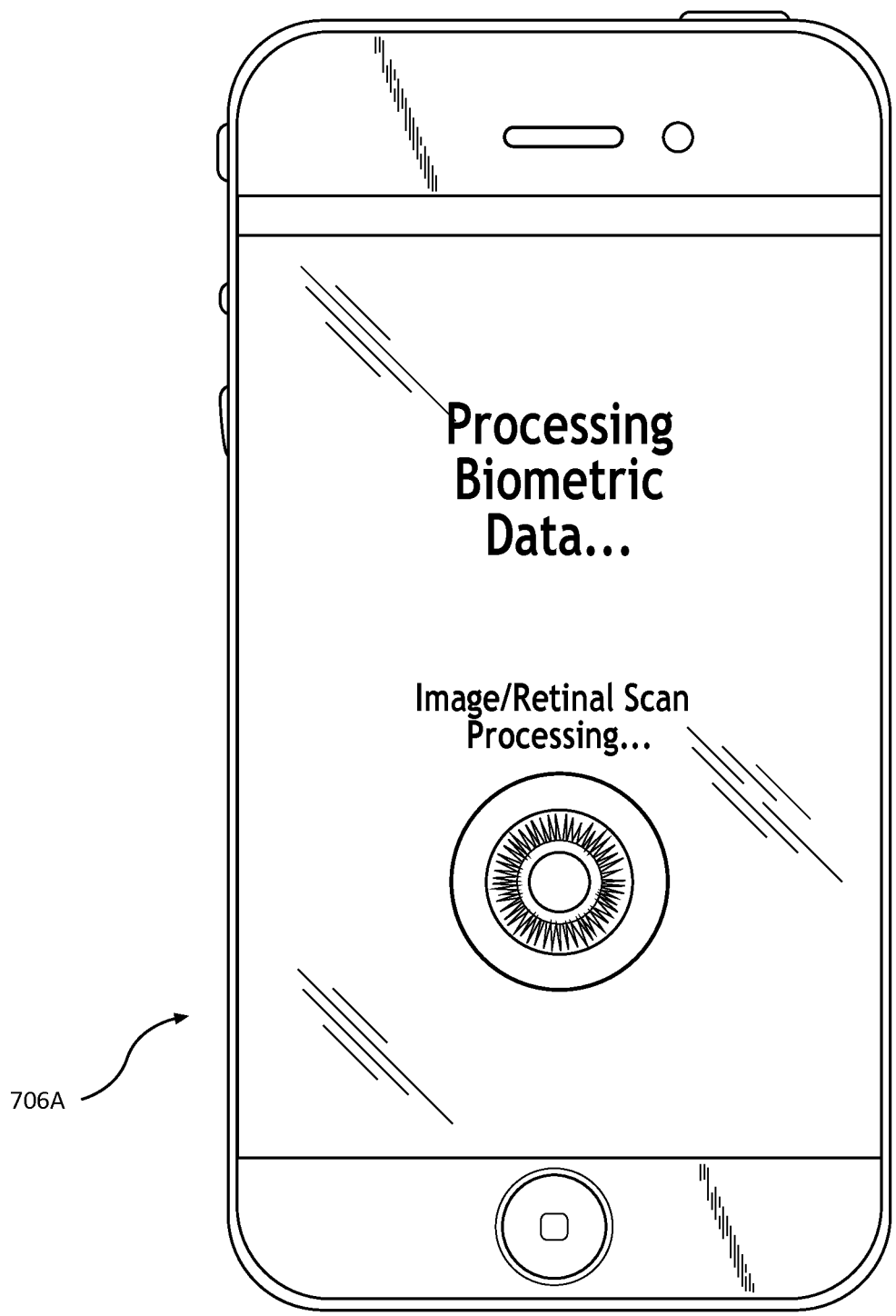

As illustrated in FIG. 7A, the electronic device 702 detects a gaming network of a gaming venue. This detection operation may be preconfigured for a variety of detection operations, including but not limited to, a voice command, a remote command, a selection option located on the electric application device and/or EGM, and/or a signal broadcast by a gaming venue governed by a gaming commission that initiates the electric application device upon entering a private, secured network of the gaming venue. The electronic device 702 may ask the user/player if they would like to activate the biometric sensors by selecting a "YES" option or a "NO" option. The electronic device 702 may be preconfigured to automatically activate the biometric sensor upon detecting a gaming network thereby bypassing any manual confirmation steps. As illustrated in FIG. 7*b*, upon activating the electric application device 704A for acquiring biometric data, the user is instructed to use the biometric sensor for reading, scanning, determining, capturing, receiving, gathering, and/or collecting the biometric data. For example, in FIG. 7B the external device 704A directs and instructs the user to "please look into the image capture device" with an illustration of a user looking into the image capture device (e.g., the spiraling circle area on the electric application device). The image capture device may be a retinal scanner, a camera for photographing a user, and/or other type of device for capturing biometric images. The user then provides the electronic device 704A with the biometric data. By way of example only, FIG. 7B illustrates a retinal image of the user's eye being scanned for capturing a retinal image. As observed in FIG. 7C, the user biometric information (e.g., the retinal image) is now being processed, at least in part by the electrical device 706A, for verification and identification of a user's identification. FIG. 7C displays the captured retinal image on below the "Image/Retinal Scan processing" text.

Figure 7D:
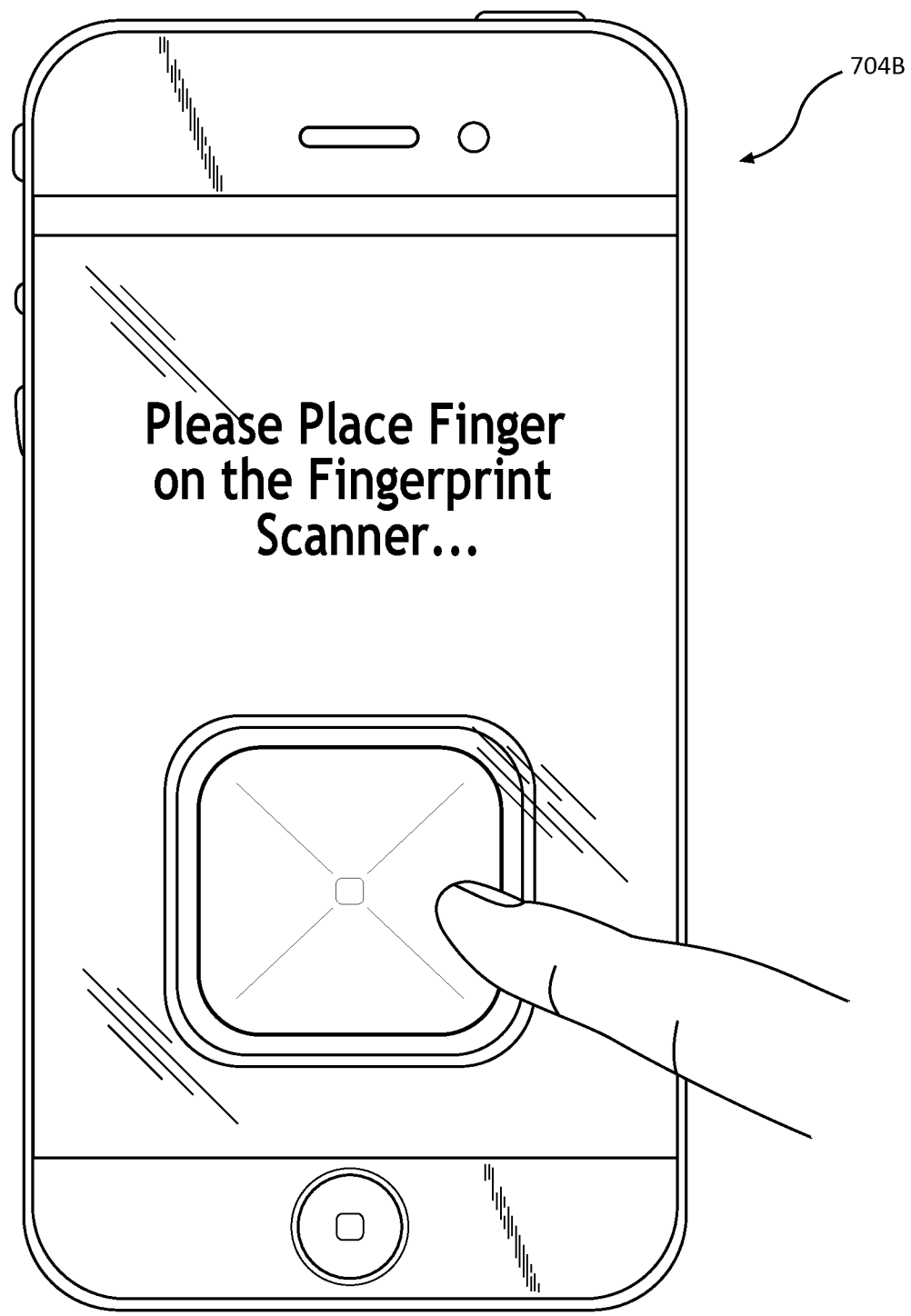
Figure 7E:
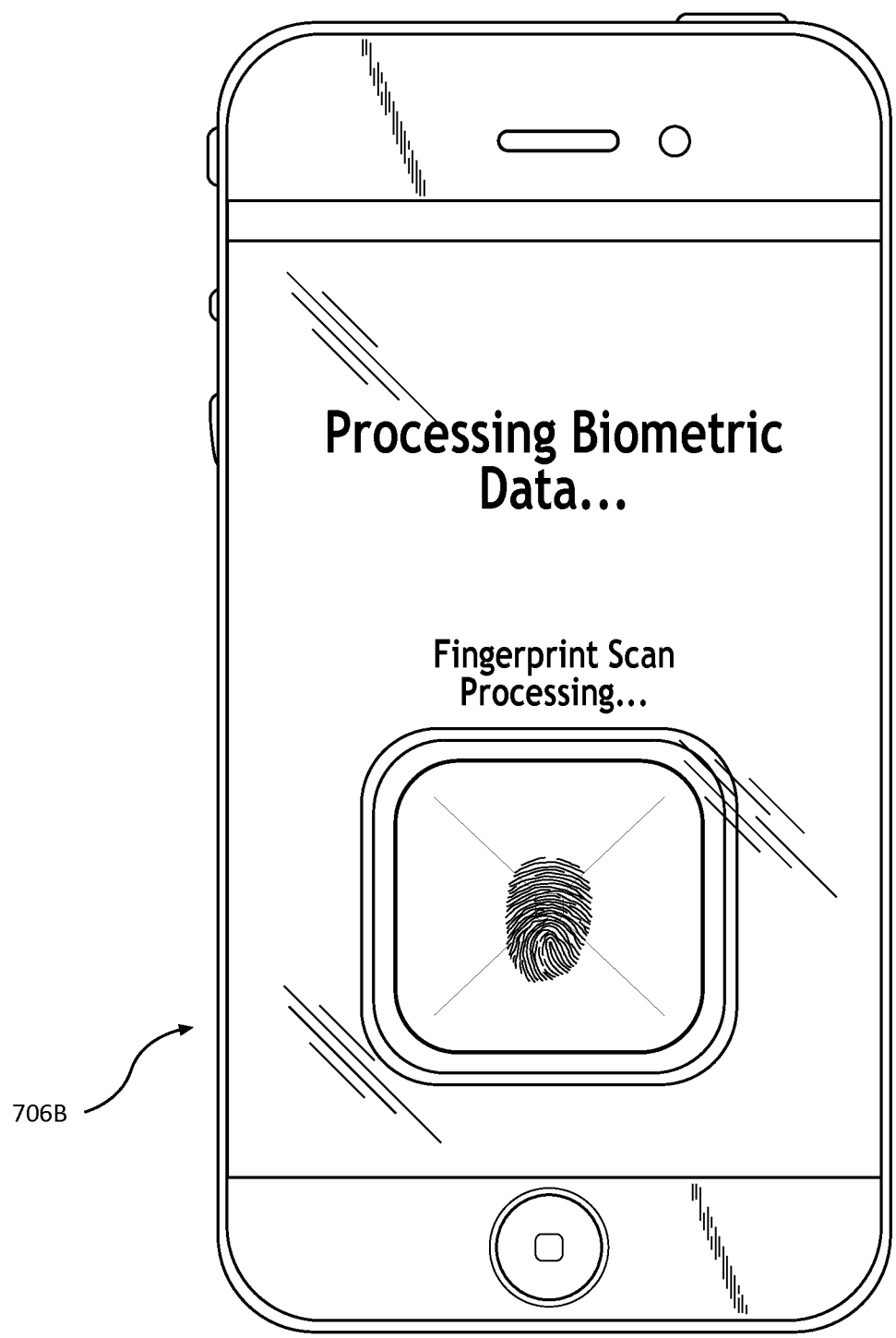

In an additional embodiment, by way of example only, as illustrated in FIG. 7D, the electronic device 704B directs and instructs the user to "please place finger on the fingerprint scanner. As observed in FIG. 7E, the user then proceeds with the provided instructions and provides the electronic device 704B with the biometric data. Here the user places the finger on the finger print scanner (e.g., the area shown in the square box with the "X" shape design). The electric application device then obtains the biometric information through the biometric sensor. As observed in FIG. 7E, the user biometric information (e.g., the fingerprint) is now being processed, at least in part by the electrical device 706A, for verification and identification of a user's identification. FIG. 7E displays the captured fingerprint image, in the area shown in the square box with the "X" shape design, below the "Fingerprint Scan Processing" text. The biometric device may verify and/or confirm the identity of the user based at least partly on the biometric information obtained by the biometric sensor using any suitable technique. In one embodiment, the identity of the user is verified using a server-based gaming sbX™ network of a gaming venue.

Figure 7F:
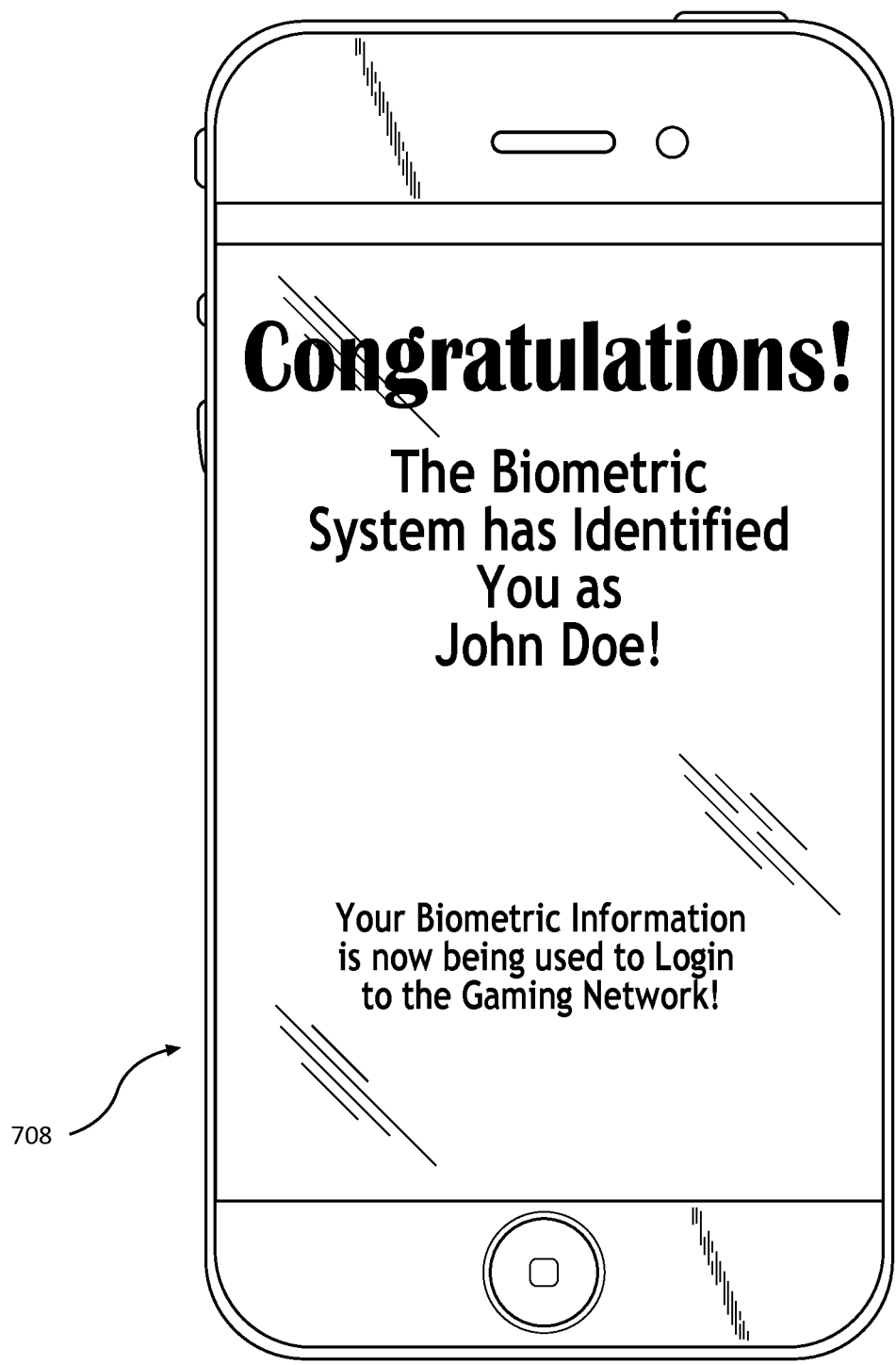

Upon successful validation of any of the above listed biometric information, as illustrated in FIG. 7F, the electric application device 708 may indicate that the biometric information has been verified and identified. For example, in one embodiment, as illustrated in FIG. 7F, once the identity of the player/user has been verified by the gaming network (e.g., using a server-based gaming sbX™ network), the gaming network may communicate this information to the electric application device 708 and/or PED 708 with a notification such as "Congratulations! The biometric system has identified you as John Doe!" The gaming venue may determine the content that is contained in the notifications and the type of notifications. FIG. 7F also illustrates that the electric application device 708 will use the verified and identified biometric information to login to the gaming network.

Figure 8:
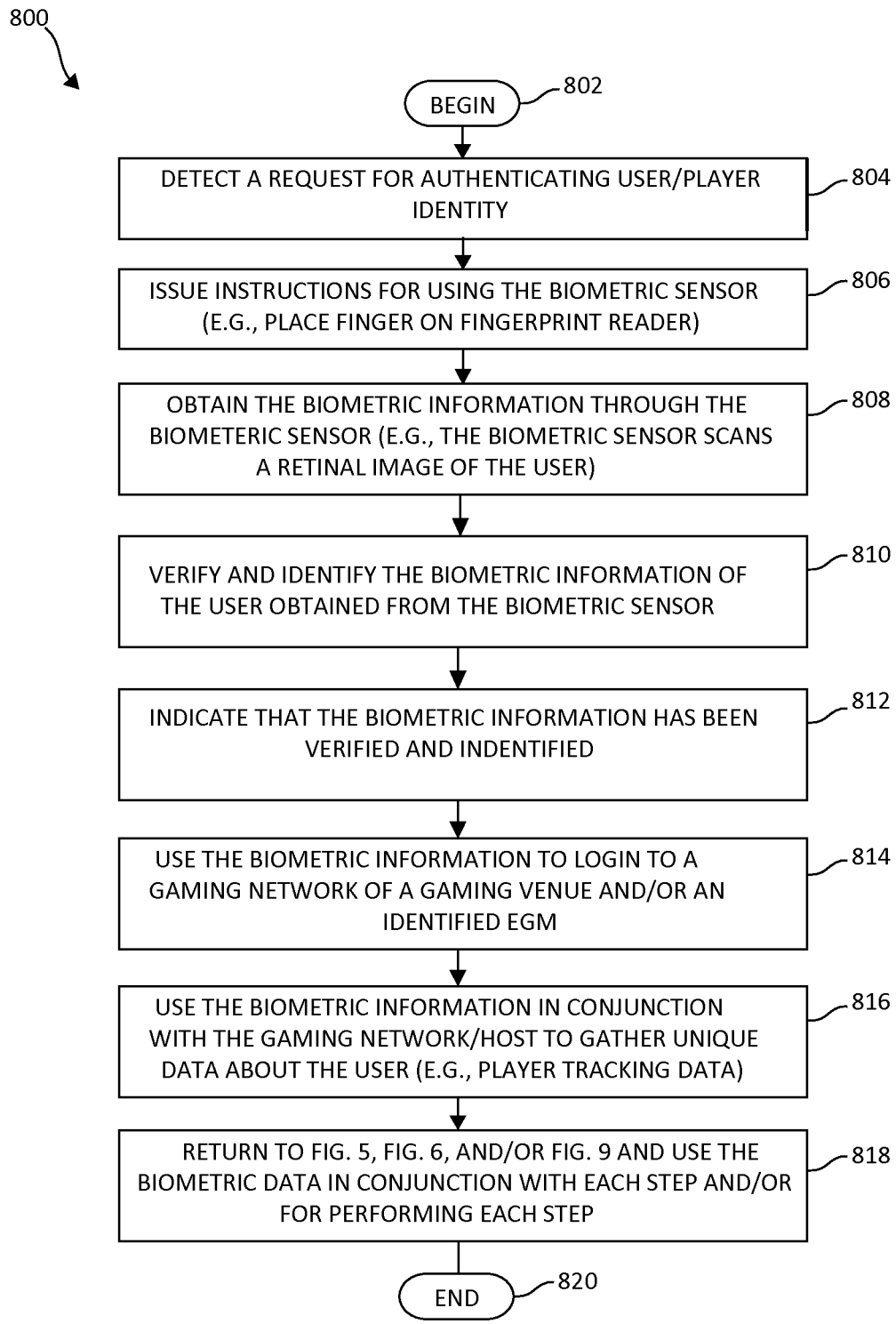
FIG. 8 is a flow chart illustrating an exemplary method for using an external application using biometric technology for gaining secured access to a server-based gaming network in which aspects of the present invention may be realized.

FIG. 8 is a flow chart illustrating an exemplary method 800 for using an external application using biometric technology for gaining secured access to a server-based gaming network. The method 800 begins (step 802) and the method detects a request for authenticating user/player identity (step 804). The detection may be a voice command, a remote command, a selection option located on the External Application and/or EGM, and/or a signal broadcast by a gaming venue that initiates the external application upon entering a private, secured network of the gaming venue. Examples of events where authenticating a user may be desirable may include accessing a private network within gaming venue, accessing an EGM within a gaming venue, and/or financial accounts associated with the player's gaming account and/or financial institution. In an alternative embodiment, the event may be for accessing an EGM for play, performing a financial transfer authentication and/or completion, and/or any other service allowed by a gaming venue and/or regulatory commission governing gaming activities within the jurisdiction of a gaming commission. Moreover, a service window application, in communication with the external application and/or EGM and associated with a gaming network, located on the external device/PED in communication with a biometric sensor (e.g., a fingerprint reader and/or an image capture device, such a retinal scanner, camera, etc.) may be used for directing and/or assisting with a request for authenticating a user identity.

Upon detection of such a request, a user is instructed to use the biometric sensor for reading, scanning, determining, capturing, receiving, gathering, and/or collecting the biometric data (e.g., "please place finger on the fingerprint scanner") (step 806). The biometric device may be a fingerprint scanner, a retinal scanner, voice recorder, recognition device, image reader, and/or any device that captures biometric information that allows for identification based on unique characteristics, including but not limited to, fingerprint scans, iris scans, and voice recognition. In one embodiment the biometric devices utilize technology to capture and process this type of information in a server-based gaming network (e.g., sbX™ network) of a gaming venue governed by a gaming commission and/or other governing body responsible for governing any and/or all gaming activities.

The method 800 may obtain biometric information through the biometric sensor (step 808). The method 800 may verify the identity of the user based at least partly on the biometric information obtained by the biometric sensor using any suitable technique (step 810). In one embodiment, the identity of the user is verified using a server-based gaming sbX™ network of a gaming venue. If an identity cannot be verified, the method 800, using the biometric sensor, may try to obtain biometric data again. The method 800 may indicate that the biometric information has been verified and identified (step 812). For example, in one embodiment, once the identity of the player/user has been verified by the gaming network (e.g., using a server-based gaming sbX™ network), the gaming network may communicate this information to a gaming venue, an EGM within the gamine venue, a financial institution, and/or a user (e.g., information is sent to the user having an external application, such as a handheld electronic device, etc.) and indicates that the identity has been verified. The method 800 may use the biometric information to login to a gaming network of a gaming venue and/or an EGM (step 814). For example, in one embodiment, the method 800 may communicate and provide the gaming venue and/or the EGM with the biometric information for a secure login to the gaming venue and/or the EGM using a server-based gaming sbX™ network and gaming applications. The method 800 uses the biometric data for performing a secured login operation into a financial institution, an EGM, and/or gaming network of the gaming venue. The method 800 may use the biometric data to gather information about the user (step 816). For example, in one embodiment, embodiment, by way of example only, once the gaming venue and/or the EGM verifies the secured login based on the biometric data using the server-based gaming network (e.g., sbX™ network, sbX™ server), a service window application provided by the gaming venue and/or the EGM that is in communication with the sbX™ network/server and host may appear in an external device of the user upon successful login to the gaming network. In one embodiment, a host in the server-based gaming sbX™ network, having previously identified and authenticated the user's identification (e.g., using biometric data), may gather specific data from a player's account, players tracking system, gaming venue promotions, previously used and/or new service window application, and/or historical data, and the biometric information, and dynamically provide the user with the mirrored image of any service window application of a gaming venue and/or a favorite EGM and the gathered data along with all the features, promotions, notifications, alerts, gaming functions, and/or other served window application options provided by a gamine venue that is in accordance with gaming commission regulations. At this point, using the biometric data, the method 800 returns to either FIGS. 5, 6, and/or 9 and perform the steps illustrated above in FIGS. 5, 6, and 9 (step 818). The method 800 ends (step 820).

For example, in one embodiment, an electric application device may communicate and provide the gaming venue and/or the EGM with the biometric information for a secure login to the gaming venue and/or the EGM using a server-based gaming network (e.g., sbX™ network) and gaming applications and then may communicate and provide the gaming venue and/or the EGM with the biometric information to be included with the transfer verification message. Also, as each gaming venue may be located in different jurisdictions, the regulatory gaming commission rules, laws, and regulations may vary and alter accordingly. Thus, in one embodiment, the electric application device may have previously obtained approval from a regulatory gaming commission for reading, scanning, determining, capturing, receiving, gathering, and/or collecting the biometric data. The electric application device may be operated by a processor on a server-based gaming server (e.g., sbX™ server) in the server-based gaming network. The electronic application device itself may even be installed onto any one of the EGM's located within the gaming venue.

Figure 9:
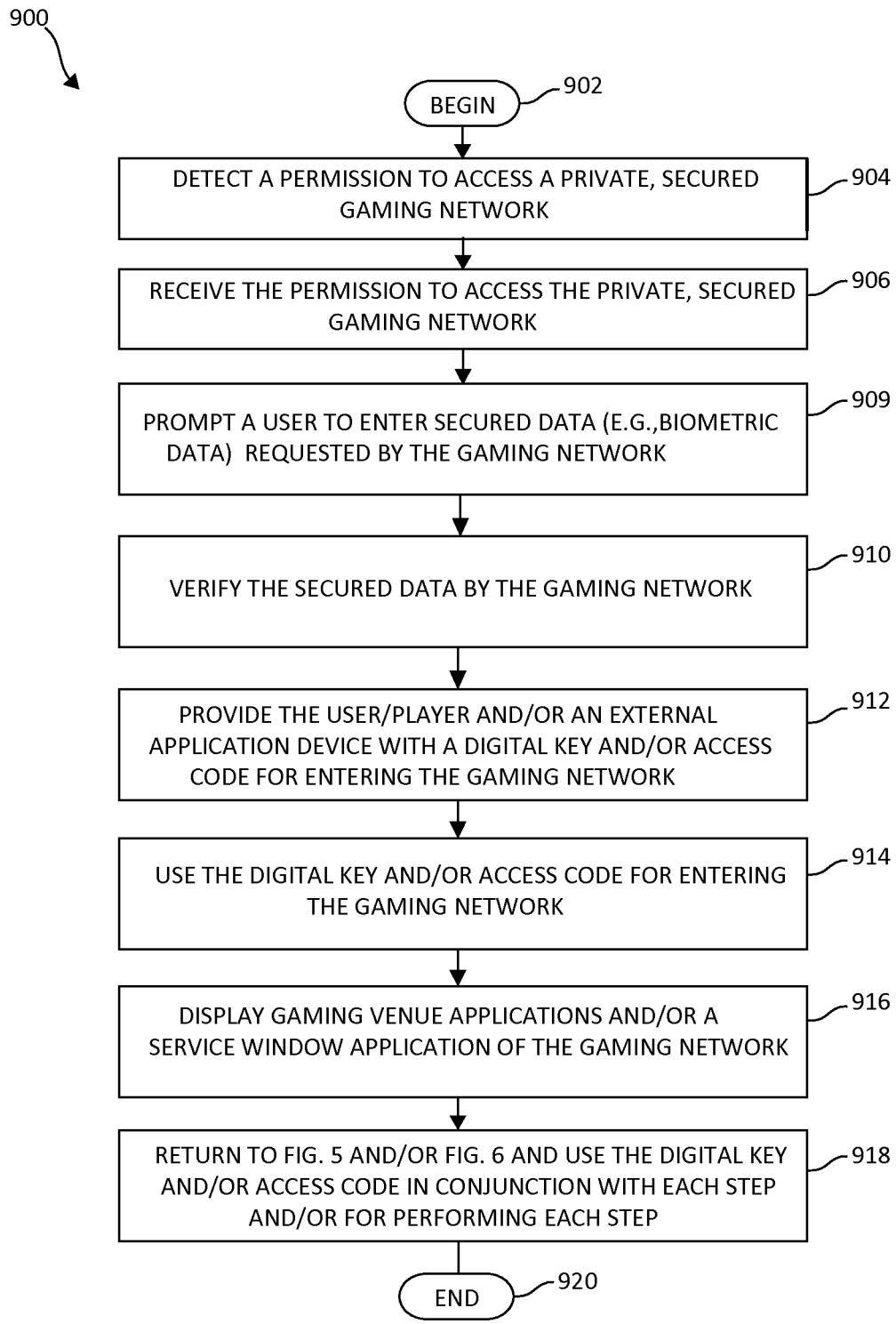
FIG. 9 is a flow chart illustrating an exemplary method for gaining secured access to a server-based gaming network in which aspects of the present invention may be realized.

FIG. 9 is a flow chart illustrating an exemplary method 900 for gaining secured access to a server-based gaming network. The method 900 begins (step 902) by an external application seeking permission to access a private, secured server-based gaming network (step 904). The permission request includes data related to the owner/user of the external application and the external application itself. A gaming network and host/server, such as the sbX™ network/server, receives the permission request from the external application (step 906). The external application and/or user/player is prompted by the gaming network and host/server to enter a variety of secured data (step 908). For example, the gaming network and host/server may request the user to provide an access key code, biometric data, player account information associated with the gaming venue, a series of private information and questions, a users age, date of birth, and/or any other information that may be required by a gaming venue, and/or a gaming regulatory commission that governs the gaming venue. Next, the method 900 verifies the secured data in the gaming network and host/server, such as the sbX™ network/server and host (step 910). The secured data may also verify the external device and determine if the device and/or software of the external device is approved and sanctioned by gaming regulatory commission that governs the gaming venue. Upon successful verification of the secured data, the gaming network and host/server, such as the sbX™ network/server and host provide the external application with a digital key and/or access code (both of which may be encrypted) for entering and gaining access to the private, the gaming network and host/server, such as the sbX™ network/server and host (step 912). The method 900 may use the digital key and/or access code to gain access to the gaming network and host/server, such as the sbX™ network/server and host (step 914). For example, the user may enter, and/or the external application may automatically enter, the encrypted digital key and/or access code into a web portal provided by the gaming venue. In one embodiment, the encrypted digital key and/or access code may be used in association with biometric data for accessing the gaming network. A gaming venue application (e.g., a service window application) may be displayed in the external application device (e.g., handheld device such as a smartphone), and/or a mirrored image of any service window application provided by a gaming venue on a specifically chosen EGM may be displayed on the external application (step 916). At this point, the method 900 returns to either FIGS. 5 and/or 6 and performs the steps illustrated above in FIGS. 5 and/or 6 (step 918). The method 900 ends (step 920).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for transfer verification of mobile payments in a gaming system in a gaming network in order for gaining a player's confidence performed by one or more processors, the method comprising:
    receiving a permission request to access the gaming network from a personal electronic device (PED);
    requesting, as part of a user login process for the gaming network, the PED to provide to the gaming network a plurality of security protocols for gaining access to a gaming network, wherein the plurality of security protocols includes at least biometric data, player account information associated with the private, secured gaming network, and a plurality of user profile data required by the gaming network;
    performing and verifying the plurality of security protocols for gaining access to the gaming network, via a gaming network server in the gaming network, governed by a regulatory gaming commission, wherein an encrypted digital security key is provided to the PED during the performing and verifying;
    following a successful completion of the user login process, granting to the PED access to the gaming network upon receiving, via a service window application displayed within a service window of an electronic game machine (EGM), the encrypted digital security key, wherein the service window application enables the EGM to communicate with a bill acceptor to simulate bills and tickets;
    sending, via the service window application of the EGM to the PED subsequent to performing and verifying the plurality of security protocols relating to the PED that provided the biometric data, player account information associated with the gaming network, and the plurality of user profile data required by the gaming network via the PED, a transfer verification message containing a mobile payment transfer information, the encrypted digital security key provided by a gaming network server, an EGM identifier, an EGM serial number, and a geolocation comprising a physical location within a gaming venue of an EGM in the transfer verification message for providing the transfer verification for completion of a mobile payment transfer between the PED and the EGM employing the service window, wherein the transfer verification is sent to the PED only within the private, secured gaming network comprising an Intranet of the gaming venue such that the player must be physically located within the gaming venue, be logged in with the gaming network, and have the PED connected with the gaming network to receive the transfer verification message on the PED, and wherein the service window application displayed within the service window of the EGM is further displayed within the PED and the service window application is controlled and operated by the gaming network server in communication with the EGM such that the player simultaneously views a representative mirror image of the service window application displayed within the service window of the EGM on a display of the PED thereby enabling the player to confirm, in real-time, the EGM identifier, the EGM serial number, and the geolocation in both the service window of the EGM and the transfer verification message; and
    requesting an approval of the mobile payment transfer that is associated with the transfer verification message such that the approval trusts the mobile payment transfer via the service window application and an audit trail is maintained through the service window application of the EGM.

2. The method of claim 1, further including communicating the transfer verification message to the PED via one of a plurality of communication channels in a networking environment.

3. The method of claim 2, further including providing bi-directional communication between the PED and the EGM.

4. The method of claim 1, further including sending the transfer verification message as an email.

5. The method of claim 1, further including sending the transfer verification message as a short message service (SMS) text message.

6. The method of claim 1, further including issuing the transfer verification message upon a player of a gaming device performing a cash out operation.

7. The method of claim 1, further including:
resolving disputes according to the transfer verification message relating to the mobile payment transfer,
providing the transfer verification message for accounting and taxing related purposes, and
disputing fraudulent use of the PED according to the transfer verification message.

8. The method of claim 1, further including notifying a player of a current account balance of a player wagering account in the transfer verification message.

9. The method of claim 1, further including performing one of:
providing one or more instructions for using a biometric sensor associated with the PED for capturing the biometric data,
capturing the biometric data to be included and used in the transfer verification message,
providing an indication that the biometric data that is verified and instructions to use the biometric data to login to the gaming network and the EGM,
using the transfer verification message for performing the mobile transfer to and from the EGM,
including the biometric data in the transfer verification message, and
including the encrypted digital security key in the transfer verification message.

10. The method of claim 1, further including notifying a player via the transfer verification message of a fraudulent mobile transfer upon one of the PED and player account information being one of stolen and lost.

11. The method of claim 1, further including, for preforming the mobile payment transfer, performing one of:
electronically transferring money to the EMG from the PED, and
electronically transferring money to the PED from the EGM.

12. The method of claim 1, further including using money from one of a financial institution and a player wagering account for the mobile payment transfer.

13. The method of claim 1, further including sending the transfer verification message in conjunction with requesting an approval of the mobile payment transfer.

14. A system for transfer verification of mobile payments in a gaming system in a gaming network in order for gaining a player's confidence, the system comprising:
the gaming system having a gaming network having at least one central processor device and one or more memory operable in the gaming system;
an electronic gaming machine (EGM) operable by the at least one central processor device;
a server with one or more memory that stores a player wagering account in communication with the EGM and the at least one processor device; and
wherein the at least one central processor device:
receives a permission request to access the gaming network from a personal electronic device (PED);
requests, as part of a user login process for the gaming network, the PED to provide to the gaming network a plurality of security protocols for gaining access to a gaming network, wherein the plurality of security protocols includes at least biometric data, player account information associated with the private, secured gaming network, and a plurality of user profile data required by the gaming network;
performs and verifying the plurality of security protocols for gaining access to the gaming network, via a gaming network server in the gaming network, governed by a regulatory gaming commission, wherein an encrypted digital security key is provided to the PED during the performing and verifying;
following a successful completion of the user login process, grants to the PED access to the gaming network upon receiving, via a service window application displayed within a service window of an electronic game machine (EGM), the encrypted digital security key, wherein the service window application enables the EGM to communicate with a bill acceptor to simulate bills and tickets;
sends, via the service window application of the EGM to the PED subsequent to performing and verifying the plurality of security protocols relating to the PED that provided the biometric data, player account information associated with the gaming network, and the plurality of user profile data required by the gaming network via the PED, a transfer verification message containing a mobile payment transfer information, the encrypted digital security key provided by a gaming network server, an EGM identifier, an EGM serial number, and a geolocation comprising a physical location within a gaming venue of an EGM in the transfer verification message for providing the transfer verification for completion of a mobile payment transfer between the PED and the EGM employing the service window, wherein the transfer verification is sent to the PED only within the private, secured gaming network comprising an Intranet of the gaming venue such that the player must be physically located within the gaming venue, be logged in with the gaming network, and have the PED connected with the gaming network to receive the transfer verification message on the PED, and wherein the service window application displayed within the service window of the EGM is further displayed within the PED and the service window application is controlled and operated by the gaming network server in communication with the EGM such that the player simultaneously views a representative mirror image of the service window application displayed within the service window of the EGM on a display of the PED; and
request requests an approval of the mobile payment transfer that is associated with the transfer verification message such that the approval trusts the mobile payment transfer via the service window application and an audit trail is maintained through the service window application of the EGM.

15. The system of claim 14, wherein the at least one processor device communicates the transfer verification message to the PED via one of a plurality of communication channels in a networking environment.

16. The system of claim 15, wherein the at least one processor device provides bi-directional communication between the PED and the EGM.

17. The system of claim 14, wherein the at least one processor device sends the transfer verification message as an email.

18. The system of claim 14, wherein the at least one processor device sends the transfer verification message as a short message service (SMS) text message.

19. The system of claim 14, wherein the at least one processor device issues the transfer verification message upon a player of a gaming device performing a cash out operation.

20. The system of claim 14, wherein the at least one processor device uses the transfer verification message for one of:
resolving disputes relating to the mobile payment transfer, accounting and taxing related purposes, and
disputing fraudulent use of the PED.

21. The system of claim 14, wherein the at least one processor device notifies a player of a current account balance of the player wagering account in the transfer verification message.

22. The system of claim 14, wherein the at least one processor device performs one of:
providing one or more instructions for using a biometric sensor associated with the PED for capturing the biometric data,
capturing the biometric data to be included and used in the transfer verification message,
providing an indication that the biometric data that is verified and instructions to use the biometric data to login to the gaming network and the EGM,
using the transfer verification message for performing the mobile transfer to and from the EGM,
including the biometric data in the transfer verification message, and
including the encrypted digital security key in the transfer verification message.

23. The system of claim 14, wherein the at least one processor device notifies a player via the transfer verification message of a fraudulent mobile transfer upon one of the PED and player account information being one of stolen and lost.

24. The system of claim 14, wherein the at least one processor device, for performing the mobile payment transfer, performs one of:
electronically transferring money to the EGM from the PED, and
electronically transferring money to the PED from the EGM.

25. The system of claim 14, wherein the at least one processor device uses money from one of a financial institution and a player wagering account for the mobile payment transfer.

26. The system of claim 14, wherein the at least one processor device sends the transfer verification message in conjunction with requesting an approval of the mobile payment transfer.

27. A computer program product for transfer verification of mobile payments in a gaming system in a gaming network in order for gaining a player's confidence using a processor device, the computer program product comprising a non-transitory computer-readable storage medium having computer-readable program code portions stored therein, the computer-readable program code portions comprising:
an executable portion that receives a permission request to access the gaming network from a personal electronic device (PED);
an executable portion that requests, as part of a user login process for the gaming network, the PED to provide to the gaming network a plurality of security protocols for gaining access to a gaming network, wherein the plurality of security protocols includes at least biometric data, player account information associated with the private, secured gaming network, and a plurality of user profile data required by the gaming network;
an executable portion that performs and verifies the plurality of security protocols for gaining access to the gaming network, via a gaming network server in the gaming network, governed by a regulatory gaming commission, wherein an encrypted digital security key is provided to the PED during the performing and verifying;
an executable portion that, following a successful completion of the user login process, grants to the PED access to the gaming network upon receiving, via a service window application displayed within a service window of an electronic game machine (EGM), the encrypted digital security key, wherein the service window application enables the EGM to communicate with a bill acceptor to simulate bills and tickets;
an executable portion that sends, via the service window application of the EGM to the PED subsequent to performing and verifying the plurality of security protocols relating to the PED that provided the biometric data, player account information associated with the gaming network, and the plurality of user profile data required by the gaming network via the PED, a transfer verification message containing a mobile payment transfer information, the encrypted digital security key provided by a gaming network server, an EGM identifier, an EGM serial number, and a geolocation comprising a physical location within a gaming venue of an EGM in the transfer verification message for providing the transfer verification for completion of a mobile payment transfer between the PED and the EGM employing the service window, wherein the transfer verification is sent to the PED only within the private, secured gaming network comprising an Intranet of the gaming venue such that the player must be physically located within the gaming venue, be logged in with the gaming network, and have the PED connected with the gaming network to receive the transfer verification message on the PED, and wherein the service window application displayed within the service window of the EGM is further displayed within the PED and the service window application is controlled and operated by the gaming network server in communication with the EGM such that the player simultaneously views a representative mirror image of the service window application displayed within the service window of the EGM on a display of the PED; and
an executable portion that requests an approval of the mobile payment transfer that is associated with the transfer verification message such that the approval trusts the mobile payment transfer via the service window application and an audit trail is maintained through the service window application of the EGM.

28. The computer program product of claim 27, further including an executable portion that communicates the transfer verification message to the PED via one of a plurality of communication channels in a networking environment.

29. The computer program product of claim 28, further including an executable portion that provides bi-directional communication between the PED and the EGM.

30. The computer program product of claim 27, further including an executable portion that sends the transfer verification message as an email.

31. The computer program product of claim 27, further including an executable portion that sends the transfer verification message as a short message service (SMS) text message.

32. The computer program product of claim 27, further including an executable portion that issues the transfer verification message upon a player of a gaming device performing a cash out operation.

33. The computer program product of claim 27, further including an executable portion that uses the transfer verification message for one of:
resolving disputes relating to the mobile payment transfer, accounting and taxing related purposes, and
disputing fraudulent use of the PED.

34. The computer program product of claim 27, further including an executable portion that notifies a player of a current account balance of the player wagering account in the transfer verification message.

35. The computer program product of claim 27, further including an executable portion that performs one of:
providing one or more instructions for using a biometric sensor associated with the PED for capturing the biometric data,
capturing the biometric data to be included and used in the transfer verification message,
providing an indication that the biometric data that is verified and instructions to use the biometric data to login to the gaming network and the EGM,
using the transfer verification message for performing the mobile transfer to and from the EGM,
including the biometric data in the transfer verification message, and
including the encrypted digital security key in the transfer verification message.

36. The computer program product of claim 27, further including an executable portion that notifies a player via the transfer verification message of a fraudulent mobile transfer upon one of a personal electronic device (PED) and player account information being one of stolen and lost.

37. The computer program product of claim 27, further including an executable portion that, for performing the mobile payment transfer, performs one of:
electronically transferring money to an electronic gaming machine (EGM) from a personal electronic device (PED), and
electronically transferring money to the PED from the EGM.

38. The computer program product of claim 27, further including an executable portion that uses money from one of a financial institution and a player wagering account for the mobile payment transfer.

39. The computer program product of claim 27, further including an executable portion that sends the transfer verification message in conjunction with requesting an approval of the mobile payment transfer.

* * * * *